(12) United States Patent
Fadell et al.

(10) Patent No.: US 8,782,775 B2
(45) Date of Patent: Jul. 15, 2014

(54) EMBEDDED AUTHENTICATION SYSTEMS IN AN ELECTRONIC DEVICE

(75) Inventors: Anthony Fadell, Portola Valley, CA (US); Andrew Hodge, Palo Alto, CA (US); Stephan Schell, Cupertino, CA (US); Ruben Caballero, San Jose, CA (US); Jesse Lee Dorogusker, Los Altos, CA (US); Stephen Zadesky, Portola Valley, CA (US); Emery Sanford, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 473 days.

(21) Appl. No.: 12/207,370

(22) Filed: Sep. 9, 2008

(65) Prior Publication Data

US 2009/0083847 A1    Mar. 26, 2009

Related U.S. Application Data

(60) Provisional application No. 60/995,200, filed on Sep. 24, 2007.

(51) Int. Cl.
    *G06F 7/04* (2006.01)

(52) U.S. Cl.
    USPC .............................................. 726/16; 726/19

(58) Field of Classification Search
    USPC ................................................... 726/16, 19
    See application file for complete search history.

(56) References Cited

U.S. PATENT DOCUMENTS

| | | | |
|---|---|---|---|
| 5,465,084 A | 11/1995 | Cottrell | |
| 5,559,961 A | 9/1996 | Blonder | |
| 5,677,710 A | 10/1997 | Thompson-Rohrlich | |
| 5,821,933 A | 10/1998 | Keller et al. | |
| 5,838,306 A | 11/1998 | O'Connor et al. | |
| 5,907,327 A | 5/1999 | Ogura et al. | |
| 6,151,208 A | 11/2000 | Bartlett | |
| 6,151,593 A | 11/2000 | Cho et al. | |
| 6,160,555 A | 12/2000 | Kang et al. | |

(Continued)

FOREIGN PATENT DOCUMENTS

| | | |
|---|---|---|
| CN | 1220433 | 6/1999 |
| CN | 1685357 | 10/2005 |

(Continued)

OTHER PUBLICATIONS

Chinese Office Action dated Aug. 9, 2012, Application No. 200880108306.1.

(Continued)

*Primary Examiner* — Techane Gergiso
(74) *Attorney, Agent, or Firm* — Morrison & Foerster LLP

(57) ABSTRACT

This invention is directed to an electronic device with an embedded authentication system for restricting access to device resources. The authentication system may include one or more sensors operative to detect biometric information of a user. The sensors may be positioned in the device such that the sensors may detect appropriate biometric information as the user operates the device, without requiring the user to perform a step for providing the biometric information (e.g., embedding a fingerprint sensor in an input mechanism instead of providing a fingerprint sensor in a separate part of the device housing). In some embodiments, the authentication system may be operative to detect a visual or temporal pattern of inputs to authenticate a user. In response to authenticating, a user may access restricted files, applications (e.g., applications purchased by the user), or settings (e.g., application settings such as contacts or saved game profile).

21 Claims, 10 Drawing Sheets

(56) References Cited

U.S. PATENT DOCUMENTS

| | | |
|---|---|---|
| 6,192,478 B1 | 2/2001 | Elledge |
| 6,249,606 B1 | 6/2001 | Kiraly et al. |
| 6,323,846 B1 | 11/2001 | Westerman et al. |
| 6,337,919 B1 | 1/2002 | Dunton |
| 6,347,290 B1 | 2/2002 | Bartlett |
| 6,421,453 B1 | 7/2002 | Kanevsky et al. |
| 6,424,711 B1 | 7/2002 | Bayless et al. |
| 6,570,557 B1 | 5/2003 | Westerman et al. |
| 6,573,883 B1 | 6/2003 | Bartlett |
| 6,633,310 B1 | 10/2003 | Andrew et al. |
| 6,677,932 B1 | 1/2004 | Westerman |
| 6,709,333 B1 * | 3/2004 | Bradford et al. ............... 463/29 |
| 6,720,860 B1 | 4/2004 | Narayanaswami |
| 6,735,695 B1 | 5/2004 | Gopalakrishnan et al. |
| 6,877,097 B2 | 4/2005 | Hamid et al. |
| 6,960,734 B1 | 11/2005 | Park |
| 7,124,433 B2 | 10/2006 | Little |
| 7,151,843 B2 | 12/2006 | Rui et al. |
| 7,174,462 B2 | 2/2007 | Pering et al. |
| 7,190,816 B2 | 3/2007 | Mitsuyu et al. |
| 7,236,576 B2 | 6/2007 | Schnarel et al. |
| 7,263,670 B2 | 8/2007 | Rekimoto |
| 7,286,063 B2 | 10/2007 | Gauthey et al. |
| 7,395,506 B2 | 7/2008 | Tan et al. |
| 7,420,546 B2 * | 9/2008 | Abdallah et al. ............ 345/173 |
| 7,480,870 B2 | 1/2009 | Anzures et al. |
| 7,626,598 B2 | 12/2009 | Manchester |
| 7,627,904 B2 | 12/2009 | Tokkonen |
| 7,810,105 B2 | 10/2010 | Prabandham et al. |
| 8,006,299 B2 * | 8/2011 | Suominen ...................... 726/19 |
| 8,095,879 B2 | 1/2012 | Goertz |
| 8,352,745 B2 | 1/2013 | McKeeth |
| 2001/0012022 A1 | 8/2001 | Smith |
| 2001/0044906 A1 | 11/2001 | Kanevsky et al. |
| 2001/0047488 A1 | 11/2001 | Verplaetse et al. |
| 2002/0015024 A1 | 2/2002 | Westerman et al. |
| 2002/0190960 A1 | 12/2002 | Kuo et al. |
| 2002/0191029 A1 | 12/2002 | Gillespie et al. |
| 2002/0196274 A1 | 12/2002 | Comfort et al. |
| 2003/0115490 A1 * | 6/2003 | Russo et al. .................. 713/202 |
| 2003/0120934 A1 * | 6/2003 | Ortiz ............................ 713/186 |
| 2003/0132974 A1 | 7/2003 | Bodin |
| 2003/0142138 A1 | 7/2003 | Brown et al. |
| 2003/0163710 A1 * | 8/2003 | Ortiz et al. ................... 713/186 |
| 2003/0206202 A1 | 11/2003 | Moriya |
| 2003/0222913 A1 | 12/2003 | Mattila et al. |
| 2004/0030934 A1 | 2/2004 | Mizoguchi et al. |
| 2004/0034801 A1 | 2/2004 | Jaeger |
| 2004/0042542 A1 | 3/2004 | Kawada et al. |
| 2004/0085351 A1 | 5/2004 | Tokkonen |
| 2004/0088568 A1 | 5/2004 | Tokkonen |
| 2004/0135801 A1 * | 7/2004 | Thompson et al. ........... 345/702 |
| 2004/0172562 A1 | 9/2004 | Berger et al. |
| 2004/0230843 A1 * | 11/2004 | Jansen ........................... 713/202 |
| 2004/0250138 A1 * | 12/2004 | Schneider ..................... 713/202 |
| 2004/0260955 A1 * | 12/2004 | Mantyla ........................ 713/202 |
| 2004/0268267 A1 | 12/2004 | Moravcsik |
| 2005/0050477 A1 | 3/2005 | Robertson et al. |
| 2005/0058438 A1 | 3/2005 | Hayashi |
| 2005/0060554 A1 | 3/2005 | O'Donoghue |
| 2005/0079896 A1 | 4/2005 | Kokko et al. |
| 2005/0206501 A1 * | 9/2005 | Farhat .......................... 340/5.82 |
| 2005/0212760 A1 | 9/2005 | Marvit et al. |
| 2005/0216862 A1 | 9/2005 | Shinohara et al. |
| 2005/0216867 A1 | 9/2005 | Marvit et al. |
| 2005/0221798 A1 * | 10/2005 | Sengupta et al. ............. 455/411 |
| 2005/0248542 A1 | 11/2005 | Sawanobori |
| 2005/0253817 A1 | 11/2005 | Rytivaara et al. |
| 2005/0264833 A1 | 12/2005 | Hiraoka et al. |
| 2005/0289476 A1 | 12/2005 | Tokkonen |
| 2006/0031776 A1 | 2/2006 | Glein et al. |
| 2006/0095369 A1 | 5/2006 | Hofi |
| 2006/0136087 A1 * | 6/2006 | Higashiura ................... 700/116 |
| 2006/0136734 A1 * | 6/2006 | Telek et al. ................... 713/182 |
| 2006/0161870 A1 | 7/2006 | Hotelling et al. |
| 2006/0174339 A1 | 8/2006 | Tao |
| 2006/0267955 A1 | 11/2006 | Hino |
| 2006/0289638 A1 | 12/2006 | Schilling |
| 2007/0109274 A1 * | 5/2007 | Reynolds ...................... 345/173 |
| 2007/0110287 A1 | 5/2007 | Kim et al. |
| 2007/0150826 A1 | 6/2007 | Anzures et al. |
| 2007/0150842 A1 | 6/2007 | Chaudhri et al. |
| 2007/0220273 A1 * | 9/2007 | Campisi ........................ 713/186 |
| 2007/0236330 A1 * | 10/2007 | Cho et al. ..................... 340/5.54 |
| 2007/0236475 A1 * | 10/2007 | Wherry ......................... 345/173 |
| 2007/0273658 A1 | 11/2007 | Yli-Nokari et al. |
| 2008/0034292 A1 | 2/2008 | Brunner et al. |
| 2008/0034307 A1 | 2/2008 | Cisler et al. |
| 2008/0042979 A1 | 2/2008 | Nikbin |
| 2008/0042983 A1 | 2/2008 | Kim et al. |
| 2008/0055263 A1 | 3/2008 | Lemay et al. |
| 2008/0055269 A1 | 3/2008 | Lemay et al. |
| 2008/0069412 A1 * | 3/2008 | Champagne et al. ......... 382/124 |
| 2008/0072172 A1 | 3/2008 | Shinohara et al. |
| 2008/0082934 A1 | 4/2008 | Kocienda et al. |
| 2008/0094371 A1 | 4/2008 | Forstall et al. |
| 2008/0122796 A1 | 5/2008 | Jobs et al. |
| 2008/0134170 A1 | 6/2008 | Astheimer |
| 2008/0168290 A1 | 7/2008 | Jobs et al. |
| 2008/0178283 A1 * | 7/2008 | Pratt et al. ....................... 726/19 |
| 2009/0005165 A1 * | 1/2009 | Arezina et al. .................. 463/37 |
| 2009/0006846 A1 | 1/2009 | Rosenblatt |
| 2009/0006991 A1 | 1/2009 | Lindberg et al. |
| 2009/0043180 A1 | 2/2009 | Tschautscher et al. |
| 2009/0063352 A1 | 3/2009 | Kaufman |
| 2009/0064055 A1 * | 3/2009 | Chaudhri et al. ............. 715/863 |
| 2009/0074255 A1 * | 3/2009 | Holm ............................ 382/115 |
| 2009/0128581 A1 | 5/2009 | Brid et al. |
| 2009/0169070 A1 | 7/2009 | Fadell |
| 2009/0201257 A1 | 8/2009 | Saitoh et al. |
| 2009/0215497 A1 | 8/2009 | Louch |
| 2009/0241072 A1 | 9/2009 | Chaudhri et al. |
| 2009/0284482 A1 | 11/2009 | Chin |
| 2009/0328162 A1 * | 12/2009 | Kokumai et al. ................. 726/5 |
| 2010/0053301 A1 | 3/2010 | Ryu et al. |
| 2010/0076823 A1 | 3/2010 | Feldman et al. |
| 2010/0079380 A1 | 4/2010 | Nurmi |
| 2010/0134248 A1 | 6/2010 | Adams et al. |
| 2010/0162180 A1 | 6/2010 | Dunnam et al. |
| 2010/0164684 A1 * | 7/2010 | Sasa et al. .................... 340/5.83 |
| 2010/0225607 A1 | 9/2010 | Kim |
| 2010/0235732 A1 | 9/2010 | Bergman |
| 2010/0245553 A1 | 9/2010 | Schuler et al. |
| 2010/0306718 A1 | 12/2010 | Shim et al. |
| 2011/0010672 A1 | 1/2011 | Hope |
| 2011/0013813 A1 | 1/2011 | Yamamoto et al. |
| 2011/0170750 A1 | 7/2011 | Kropp et al. |
| 2011/0283241 A1 | 11/2011 | Miller et al. |
| 2011/0285648 A1 | 11/2011 | Simon |
| 2012/0009896 A1 | 1/2012 | Bandyopadhyay et al. |
| 2012/0021724 A1 | 1/2012 | Olsen et al. |
| 2012/0023458 A1 | 1/2012 | Chaudhri et al. |
| 2012/0047574 A1 | 2/2012 | Kim et al. |
| 2012/0182226 A1 | 7/2012 | Tuli |
| 2012/0188206 A1 | 7/2012 | Sparf et al. |

FOREIGN PATENT DOCUMENTS

| | | |
|---|---|---|
| CN | 1836397 | 9/2006 |
| CN | 100999961 | 7/2007 |
| DE | 10153591 A1 | 5/2003 |
| EP | 0593386 | 4/1994 |
| EP | 0593386 A2 | 4/1994 |
| EP | 0923018 A2 | 6/1999 |
| EP | 1 284 450 A2 | 2/2003 |
| EP | 1422589 A1 | 5/2004 |
| EP | 1736908 A2 | 12/2006 |
| EP | 2 060 970 A1 | 5/2009 |
| GB | 2184576 A | 6/1987 |
| GB | 2312040 A | 10/1997 |
| GB | 2 313 460 A | 11/1997 |
| GB | 2313460 A * | 11/1997 |
| GB | 2360618 A | 9/2001 |
| JP | 60 171560 | 9/1985 |

(56) References Cited

FOREIGN PATENT DOCUMENTS

| | | |
|---|---|---|
| JP | 02 249062 | 10/1990 |
| JP | 4158434 | 6/1992 |
| JP | 05 127819 | 5/1993 |
| JP | 06 214954 | 8/1994 |
| JP | 07 084661 | 3/1995 |
| JP | 08 263215 | 10/1996 |
| JP | 09 018566 | 1/1997 |
| JP | 11 203045 | 7/1999 |
| JP | 2000 322199 | 11/2000 |
| JP | 2000 349886 | 12/2000 |
| JP | 2003-85540 | 3/2003 |
| JP | 2003 091370 | 3/2003 |
| JP | 2003067343 | 3/2003 |
| JP | 2004 252720 | 9/2004 |
| JP | 2004 348599 | 12/2004 |
| JP | 20054490 | 1/2005 |
| JP | 2005 071008 | 3/2005 |
| JP | 2005 167455 A | 6/2005 |
| TW | M317045 | 8/2007 |
| WO | 98/58346 A1 | 12/1998 |
| WO | WO 01/77792 A2 | 10/2001 |
| WO | WO 02/33882 A1 | 4/2002 |
| WO | WO 03/038569 A2 | 5/2003 |
| WO | WO 04/001560 | 12/2003 |
| WO | WO 04/021108 A2 | 3/2004 |
| WO | WO 05/041020 A1 | 5/2005 |
| WO | 2006/051462 | 5/2006 |
| WO | 2006/051462 A1 | 5/2006 |
| WO | 2007060102 A1 | 5/2007 |
| WO | 2007070014 A1 | 6/2007 |

OTHER PUBLICATIONS

Austrailian Office Action, 2012200716, Mailed Oct. 19, 2012.
Chinese Office Action and Search Report No. 200880108306.1.
Japanese Office Action No. 2010-525891.
TW Application No. 097134592, Office Action dated Apr. 12, 2013.
Bardram, J., "The trouble with login: on usability and computer security in ubiquitous computing," Centre for Pervasive Healthcare, Department of Computer Science, University of Aahus, Denmark, Published online: Jul. 23, 2005, 11 pages.
Baudisch, P., "Phosphor: Explaining Transitions in the User Interface Using Afterglow Effects," 2006, 10 pages.
DailyTech, "Neonode Patented Swipe-to-Unlock 3 Years Before Apple," dailytech.com, http://vmv.dallytech.com/ Analysis+Neonode+Patented+SwipetoUnlock+3+Years+Before+Appie, Feb. 20, 2012, 4 pages.
Fitzpatrick et al., "Method for Access Control via Gestural Verification," IBM Technical Disclosure Bulletin, vol. 36, No. 09B, Sep. 1993, 2 pages.
GridLock (Palm OS); "Graphical Security System for Your Palm," Softonic, Oct. 8, 2003, 2 pages, http://gridlock.en.softonic.com/palm.
Horry et al., "A Passive-Style Buttonless Mobile Terminal," IEEE Transactions on Consumer Electronics, vol. 40, No. 3, Aug. 2003, 6 pages.
IBM, "Touch Pad Authentication," Sep. 21, 2004, 2 pages.
Jansen, W., "Authenticating Users on Handheld Devices," The National Institute of Standards and Technology, Gaithersburg, Maryland, 2003, 13 pages.
Jermyn et al., "The Design and Analysis of Graphical Passwords," © 1999 by the USENIX Association, 15 pages.
JGUI Professional, "Touch Password Protection," printed Dec. 30, 2005, 4 pages, http://www.jgui.net/touch/index.html.
McLean et al., "Access/Control Icons (Icon Keys)," IBM Technical Disclosure Bulletin, vol. 38, No. 4, Apr. 1995, 3 pages.
Monrose, N., "Towards Stronger User Authentication," Ph.d dissertation, 1999, New York University, vol. 60/05-B of Dissertation Abstract International, Order No. AAD99-30229, 128 pages.
Najjar, L., "Graphical Passwords," International Technology Disclosures vol. 10, No. 1, Jan. 25, 1992, 1 page.
Neonode, "N1 Quick Start Guide," Neonode.com, Apr. 5, 2005, 24 pages, http://www.neonode.com/upload/DOCUMENTS/_EN/N1_Quick_Start_Guide.pdf.
Ni et al., "DiffUser: Differentiated User Access Control on Smartphones," International Conference on Mobile Adhoc and Sensor Systems, Nov. 17, 2009, Mass '09, IEEE 6th, 6 pages.
Plaisant et all., "Touchscreen Toggle Design," Proceedings of the Conference on Human Factors in Computing Systems, Addison Wesley, US, May 3, 1992, 2 pages.
Renaud et al., "My password is here! An investigation into visuo-spatial authentication mechanisms," Interacting with Computers, vol. 16, © 2004 Elsevier B.V., 25 pages, www.sciencedirect.com.
Translation of German Nullity Action Complaint against EP Patent 1 964 022 (DE No. 60 2006 1012 876.2), filed Dec. 15, 2010, 37 pages.
Wiedenbeck et al. "PassPoints: Design and longitudinal evaluation of a graphical password system," International Journal of Human-Computer Studies, vol. 63, © 2005 Elsevier Ltd., 26 pages, www.sciencedirect.com.
Statement on the preliminary opinion in the matter of *Motorola Mobility Germany GmbH* vs *Apple Inc.*, Feb. 21, 2013, together with Exhibits NK 11-NK 18, 156 pages.
Samsung response dated Feb. 21, 2013, to Court's notification in the matter of *Samsung Electronics GmbH* vs *Apple Inc.*, 6 pages.
*HTC Europe Co. Ltd.* vs, *Apple Inc.* Nullity Reply Brief dated Nov. 8, 2012, 17 pages.
*Samsung Electronics GmbH* vs. *Apple Inc.*, Second reply brief dated Nov. 19, 2012, together with exhibits D12-D21 and D25, 269 pages.
*Samsung Electronics GmbH* vs. *Apple Inc.*, Supplement to the cancellation request, dated Mar. 1, 2013, together with Exhibits D26-D32, 211 pages.
European Search Report dated Oct. 13, 2009, received in European Patent Application No. 09170574.9, which corresponds to U.S. Appl. No. 11/322,549 (Chaudhri).
Extended European Search Report dated Feb. 7, 2011, received in European Patent Application No. 10 194 359.5, which corresponds to U.S. Appl. No. 11/322,549 (Chaudhri).
International Search Report and Written Opinion dated May 25, 2007, received in International Application No. PCT/US2006/061370, which corresponds to U.S. Appl. No, 11/322,549 (Chaudhri).
International Search Report and Written Opinion dated Apr. 23, 2007, received in International Application No. PCT/US2006/061380, which corresponds to U.S. Appl. No. 11/322,550 (Anzures).
Office Action dated Feb. 7, 2008, received in U.S. Appl. No. 11/322,549, 28 pages (Chaudhri).
Office Action dated Sep. 26, 2008, received in U.S. Appl. No. 11/322,549, 32 pages (Chaudhri).
Final Office Action dated Mar. 23, 2009, received in U.S. Appl. No. 11/322,549, 40 pages (Chaudhri).
Notice of Allowance dated Aug. 10, 2009, received in U.S. Appl. No. 11/322,549, 9 pages (Chaudhri).
Office Action dated Jul. 20, 2011, received in Australian Patent Application No. 2010200661, which corresponds to U.S. Appl. No. 11/322,549, 2 pages (Chaudhri).
Notice of Acceptance dated Aug. 2, 2012, received in Australian Patent Application No. 2010200661, which corresponds to U.S. Appl. No. 11/322,549, 3 pages (Chaudhri).
Office Action dated Oct. 26, 2011, received in Australian Patent Application No. 2011101192, which corresponds to U.S. Appl. no. 11/322,549, 2 pages (Chaudhri).
Certification dated Apr. 12, 2012, of Australian Patent No. 2011101192, which corresponds to U.S. Appl. No. 11/322,549, 1 page (Chaudhri).
Office Action dated Oct. 26, 2011, received in Australian Patent Application No. 2011101193, which corresponds to U.S. Appl. No. 11/322,549, 2 pages (Chaudhri).
Certification dated Apr. 23, 2012, of Australian Patent Application No. 2011101193, which corresponds to U.S. Appl. No. 11/322,549, 1 page (Chaudhri).
Office Action dated Feb. 5, 2010, received in Chinese Application for Invention No. 200680052770.4, which corresponds to U.S. Appl. No. 11/322,549, 4 pages (Chaudhri).

(56) References Cited

OTHER PUBLICATIONS

Office Action dated Jul. 26, 2011, received in Chinese Patent Application No. 200910175855.7, which corresponds to U.S. Appl. No. 11/322,549, 8 pages (Chaudhri).

Office Action dated Jul. 4, 2012, received in Chinese Patent Application No. 200910175855,7, which corresponds to U.S. Application No. 11/322,549, 9 pages (Chaudhri).

Office Action dated Feb. 4, 2009, received in German Patent Application No. 11 2006 003 515.0-53 which corresponds to U.S. Appl. No. 11/322,549, 6 pages (Chaudhri).

Office Action dated Feb. 9. 2010, received in German Patent Appiication No. 11 2006 003 515.0, which corresponds to U.S. Appl. No. 11/322,549, 6 pages (Chaudhri).

Office Action dated Mar. 25, 2009, received in the European patent application 06 846 405.6, which corresponds to U.S. Appl. No. 11/322,549, 6 pages (Chaudhri).

Office Action dated Apr. 22, 2011, received in Japanese Patent Application No. 2008-547675, which corresponds to U.S. Appl. No. 11/322,549, 3 pages (Chaudhri).

Office Action dated Nov. 4, 2011, received in Japanese Patent Application No. 2008-547675, which corresponds to U.S. Appl. No. 11/322,549, 3 pages (Chaudhri).

Office Action dated Sep. 18, 2012, received in Japanese Patent Appiication No. 2008 547675, which corresponds to U.S. Appl. No. 11/322,549, 2 pages (Chaudhri).

Grant of application dated May 25, 2013, received in Japanese Patent Application No. 2012-091352, which corresponds to U.S. Appl. No. 11/322,549, 3 pagesi(Chaudhri).

Office Action dated Mar. 11, 2013, received in Japanese Patent Application No. 2013-007818, which corresponds to U.S. Appl. No. 11/322,549, 5 pages (Chaudhri).

Grant of application dated May 31, 2013, received in Japanese Patent Application No. 2013-007818, which corresponds to U.S. Appl. No. 11/322,549, 4 pages (Chaudhri).

Notice of Allowance dated Jul. 5, 2013, received in Japanese Patent Application No. 2013-101691, which corresponds to U.S. Appl. No. 11/322,549, 4 pages (Chaudhri).

Office Action dated Mar. 5, 2010, received in Korean Patent Application No. 10-2008-7018109, which corresponds to U.S. Appl. No. 11/322,549, 7 pages(Chaudhri).

Office Action dated Oct. 31, 2007, received in U.S. Appl. No. 11/322,550, 23 pages (Anzures).

Office Action dated Apr. 21, 2008 received in, U.S. Appl. No. 11/322,550, 22 pages (Anzures).

Notice of Allowance dated Sep. 19, 2008, received in U.S. Appl. No. 11/322,550, 8 pages (Anzures).

Office Action dated Jul. 24, 2009, received in U.S. Appl. No. 12/345,584, 11 pages (Anzures).

Office Action dated Nov. 16, 2009, received in U.S. Appl. No. 12/345,584, 17 pages (Anzures).

Notice of Allowance dated Jun. 3, 2010, received in U.S. Appl. No. 12/345,584, 9 pages (Anzures).

Office Action mailed Jan. 29, 2010, received in U.S. Appl. No. 12/477,075, 18 pages (Chaudhri).

Office Action dated Sep. 17, 2010, received in U.S. Appl. No. 12/477,075, 9 pages (Chaudhri).

Office Action dated Feb. 7, 2011, received in U.S. Appl. No. 12/477,075, 10 pages (Chaudhri).

Notice of Allowance dated Aug. 10, 2011, received in U.S. Appl. No. 12/477,075, 12 pages (Chaudhri).

Office Action dated Jan. 6, 2012, received in U.S. Appl. No. 13/204,572, 15 pages (Chaudhri).

Notice of Allowance, dated Jun. 12, 2012, received in U.S. Appl. No. 13/204,572, 9 pages (Chaudhri).

Office Action dated Nov. 25, 2011, received in U.S. Appl. No. 12/250,659 (Chaudhri).

Notice of Allowance dated May 11, 2012, received in U.S. Appl. No. 13/250,659, 15 pages (Chaudhri).

Office Action dated Nov. 19, 2012, received in U.S. Appl. No. 13/563,663, 16 pages (Chaudhri).

Notice of Allowance dated Aug. 15, 2013, received in U.S. Appl. No. 13/563,663, 14 pages (Chaudhri).

Notice of Allowance dated Jun. 25, 2013, received in U.S. Appl. No. 13/787,712, 16 pages (Chaudhri).

Notice of Allowance dated Sep. 5, 2013, received in U.S. Appl. No. 13/787,716, 16 pages (Chaudhri).

Notice of Allowance dated Jun. 17, 2013, received in U.S. Appl. No. 13/791,799, 16 pages (Chaudhri).

Neonode, Inc., "Welcome to the N1 Guide," neonode.com, publication date unknown, 42 pages, http://www.ebookspdf.com/gadget/2818/neonode-n1m-manual/.

Office Action dated Nov. 28, 2013, received in Australian Patent Application No. 2012254900, which corresponds to U.S. Appl. No. 11/322,549, 3 pages (Chaudhri).

Notice of Allowance dated Dec. 13, 2013, received in U.S, Appl. No. 13/563,663, 13 pages (Chaudhri).

Notice of Allowance dated Oct. 30, 2013, received in U.S. Appl. No. 13/791,799, 12 pages (Chaudhri).

Office Action dated Sep. 11, 2013, received in U.S. Appl. No. 13/791,808, 21 pages (Chaudhri).

Notice of Allowance dated May 2, 2013, received in U.S. Appl. No. 12/842,899, 11 pages (Shi).

\* cited by examiner

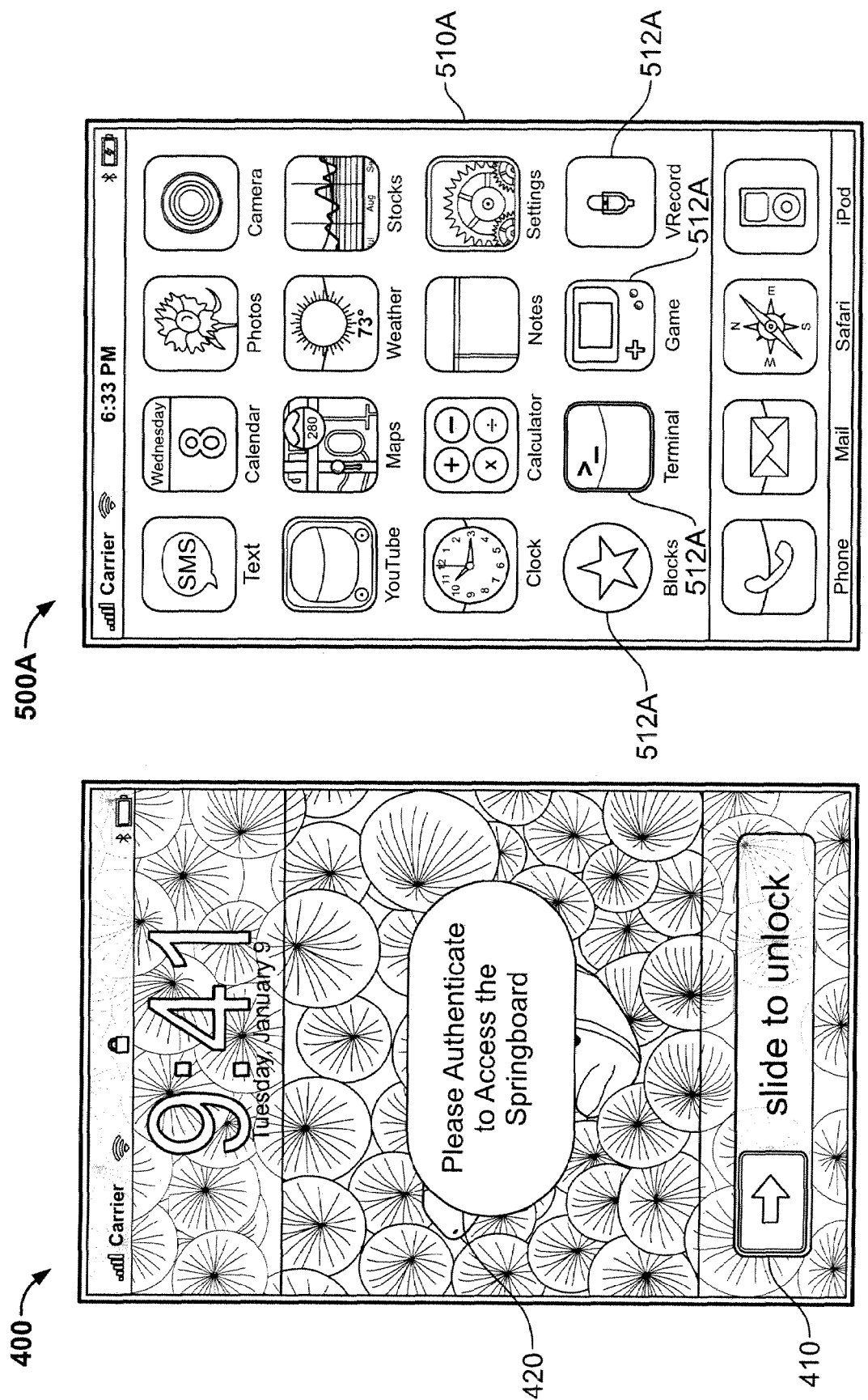

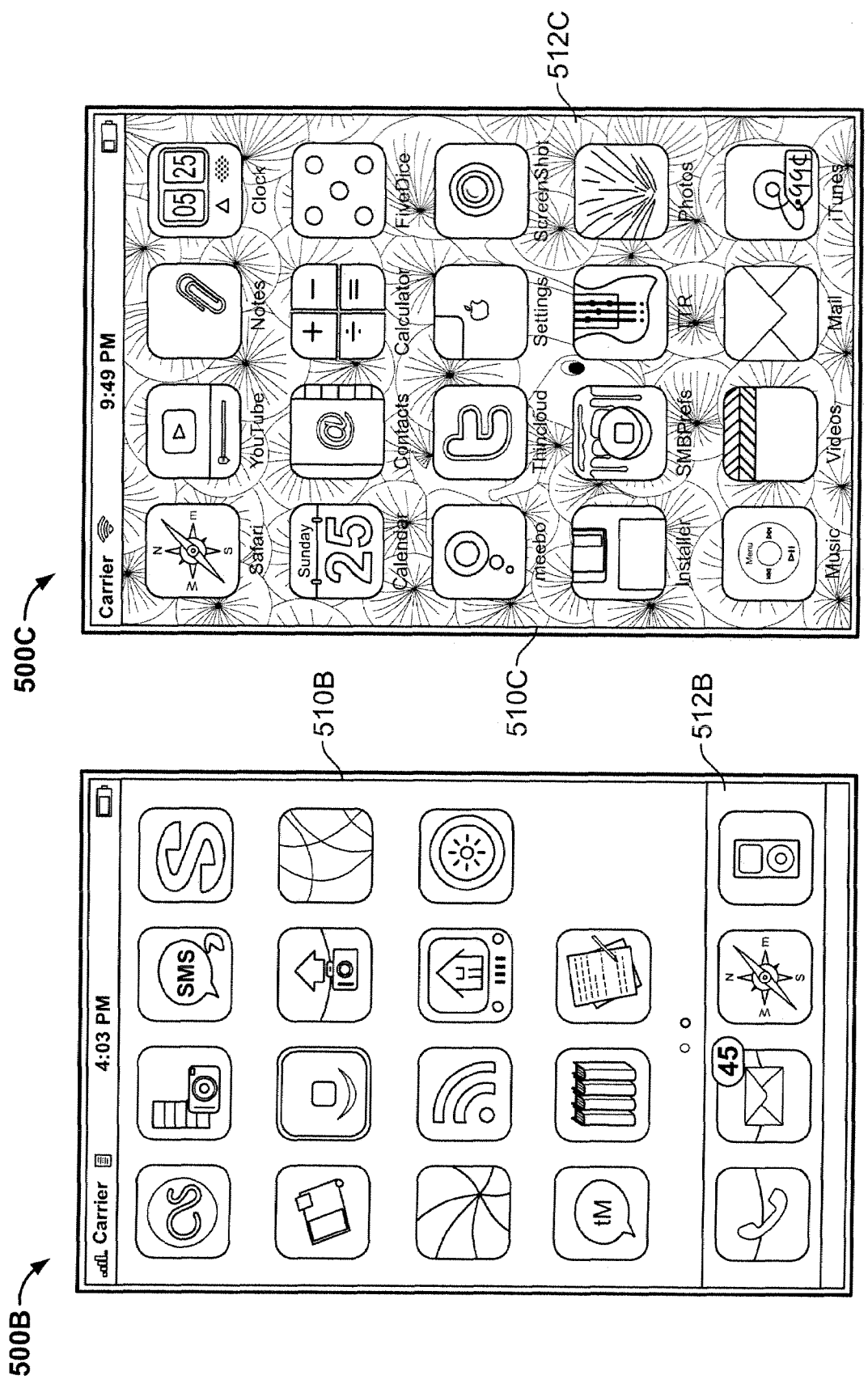

EMBEDDED AUTHENTICATION SYSTEMS IN AN ELECTRONIC DEVICE

CROSS-REFERENCE TO RELATED APPLICATION

This application claims priority from U.S. Provisional Patent Application No. 60/995,200, filed Sep. 24, 2007, which is incorporated by reference herein in its entirety.

BACKGROUND OF THE INVENTION

This invention is directed to electronic devices with embedded authentication systems.

Electronic devices, and in particular portable electronic devices, are used to store personal information. For example, users may use cellular telephones, PDAs, smart phones, or other electronic devices to store contacts, e-mail, calendar information, documents, and other information used by the user. While this information may not necessarily be confidential, users may desire that at least some of that information be unavailable to other people. One approach for preventing unauthorized people from accessing and viewing the user's personal information may be to require users of the electronic device to provide a password or pass code prior to enabling device functions or accessing device resources. For example, the electronic device may require a user to enter a four number or four letter pin prior to displaying the device home screen (e.g., a spring board) or menus. As another example, an accessory device for detecting a user's fingerprint or for scanning a user's retina may be coupled to the device such that the user must first show an authorized fingerprint or retina before receiving access to the device.

While both of these approaches may be useful, restricting access based on a password or pass code is effective only so long as no other user knows the password or pass code. Once the password or pass code is known, the restriction mechanism may become ineffective. Also, a password or pass code may be forgotten, thus locking an authorized user out of the device. In addition, requiring a user to provide a fingerprint or submit to a retina scan may be time consuming and bothersome for the user, requiring an additional step before the user can access the device. While this approach is more secure than entering a password or pass code, it comes at a cost in hardware (e.g., the necessary scanner, detector, or reader) and time. It would be desirable therefore, to provide an electronic device by which biometric and other authentication mechanisms are implemented in the device such that the device authenticates the user quickly and seamlessly, for example as the user turns on, unlocks or wakes the device.

SUMMARY OF THE INVENTION

Methods, electronic devices and computer readable media for authenticating a user of an electronic device are provided. In some embodiments, an electronic device may seamlessly authenticate a user. The electronic device may receive an input from a user, the input provided by an input mechanism of the electronic device. The electronic device may detect identification information as the user provides the input from one or more sensors embedded in or adjacent to the input mechanism. The electronic device may authenticate the user by comparing the detected identification information with identification information stored in a library of the device. For example, the sensor may include a sensor for detecting features of a user's skin, or features underneath a user's skin. The sensor may be embedded in at least one of a touch screen, a button (e.g., of a keyboard or mouse), device housing near an input mechanism (e.g., laptop housing near keyboard), or any other suitable location.

In some embodiments, the electronic device may determine that a user is aligned with a sensing component of the device without directing the user to align with the sensing component. For example, the sensing component may be positioned such that the sensing region of the sensor includes expected positions of the user while the user operates the electronic device. The sensor may detect one or more biometric attributes of the user (e.g., facial or eye features) using the sensing component. For example the sensor may include a camera or optical sensor located adjacent to a display of the device. The user may then be authenticated by comparing the detected biometric attributes with a library of biometric attributes stored by or accessible to the electronic device.

In some embodiments, the electronic device may authenticate a user based on common attributes of options selected by a user. The electronic device may display several selectable options for selection by the user, and may receive a user selection of a subset of options. The electronic device may then identify one or more attributes common to some or all of the selected option. The attributes may include, for example at least one of, size, color, contour, fill pattern, shape, alignment with other options, the position of an option relative to other options, the source of the option, or any other suitable attribute. The electronic device may then authenticate the user based on the identified attribute. For example, if the user has selected all of the shapes sharing an attribute associated with a particular user, the electronic device may authenticate the user.

In some embodiments, the electronic device may authenticate a user based on a pattern of inputs received by the device. The electronic device may include a sensor operative to detect several inputs provided by a user. For example, the sensor may include an input mechanism operative to receive inputs provided by a user. As another example, the sensor may include an accelerometer or gyroscope operative to detect motion of or contacts with the electronic device. The electronic device may be operative to identify a pattern of the detected inputs, and to compare the identified pattern with patterns stored in memory to authenticate the user. The patterns may include temporal patterns (e.g., related to the delays between consecutive inputs), visual patterns (e.g., related to attributes of several options selected by the user or inputs provided by the user), or combinations of these. Upon authenticating the user, the electronic device may provide the user with access to restricted electronic device resources.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 4 is a schematic view of an illustrative display screen for directing a user to authenticate prior to accessing device resources in accordance with one embodiment of the invention;

FIGS. 5A-C are schematic views of illustrative display screens associated with different users provided in response to authenticating the user in accordance with one embodiment of the invention;

DETAILED DESCRIPTION

Figure 1:
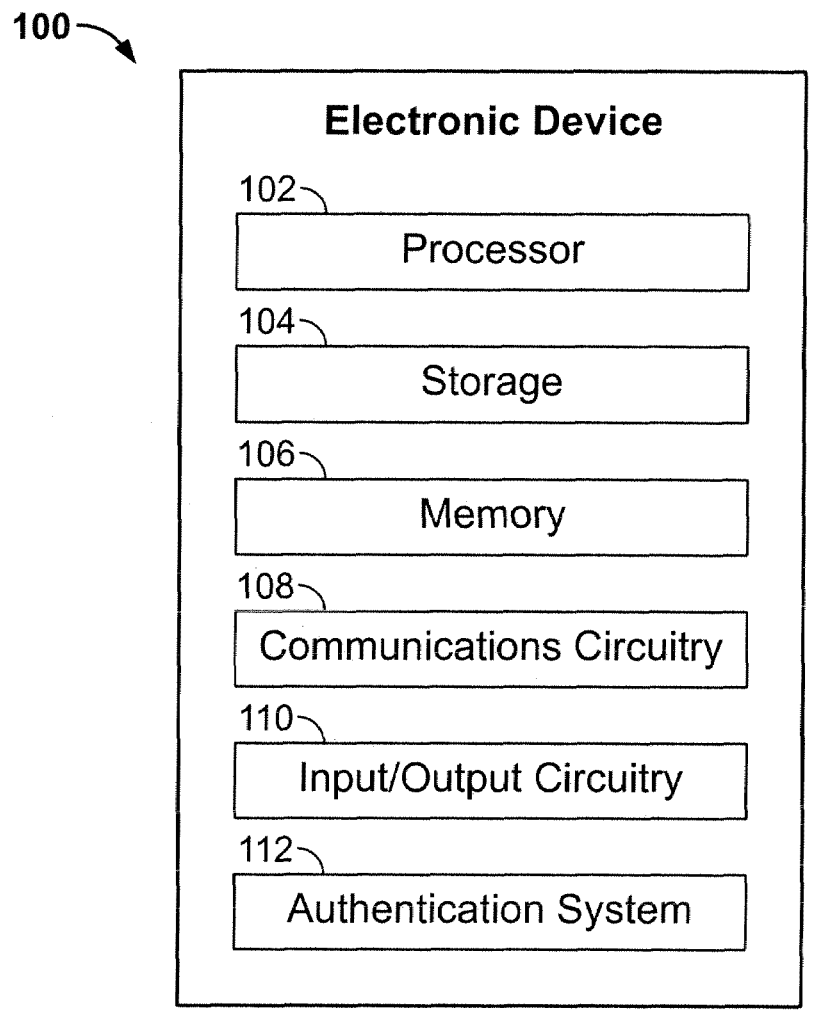
FIG. 1 is a schematic view of an illustrative electronic device for use with an authentication system in accordance with one embodiment of the invention.

An electronic device having an authentication system for restricting access to electronic device resources is provided. Access to any suitable electronic device resource may be restricted, including for example access to files or data stored on or available to the device. As another example, access to particular applications may be restricted (e.g., applications purchased by particular users, or applications associated with administrative tasks or privileges). As still another example, access to personal settings (e.g., displayed options, background images, or the icons used for applications) may be restricted until the user authenticates.

Any suitable authentication system may be implemented. In some embodiments, the authentication system may include a system for detecting biometric features or attributes of a user. For example, the electronic device may include a system operative to detect and authenticate a user based on features of or under a user's skin, such as a finger print, hand print, palm print, knuckle print, blood vessel pattern, or any other suitable portion of or under the user's skin. As another example, the electronic device may include a system operative to detect and authenticate a user based on features of a user's eyes or face, or movements of the user's eyes. As still another example, the electronic device may include a system operative to detect features of a user's ear canal, an odor associated with the user, a user's DNA, or any other suitable biometric attribute or information associated with a user.

In some embodiments, the authentication system may include a system operative to identify a user based on a visual or temporal pattern of inputs provided by the user. For example, the electronic device may display several selectable options or shapes forming a visual pattern. The user may select any suitable predetermined subset of displayed options to authenticate. For example, the user may select one or more options that have a predetermined attribute (e.g., size, color, shape or contour) in common. As another example, the user may select one or more options positioned in predetermined areas of the display (e.g., independent of the attributes of the selected options). The user may select options simultaneously, sequentially, or as a combination of these.

As another example, the user may provide a series of inputs at a particular pace or in a particular pattern. For example, the user may select options with a particular delay (e.g., pause between two selections). Alternatively, the user may provide inputs detected by a sensor (e.g., an accelerometer or a gyroscope) of the device following a predetermined temporal pattern. The device may detect the inputs from vibrations caused by tapping the device or an area adjacent to the device, moving the device in a particular manner, or any other suitable approach for detecting inputs.

The electronic device may provide any suitable combination of authentication systems, including for example biometric authentication systems and pattern-based authentication systems, several biometric authentication systems, or several pattern-based systems. In some embodiments, different authentication systems may be associated with different resources, such that a user may provide authentication information for several systems before finally accessing particular restricted resources (e.g., private or personal information). The electronic device may use any suitable approach for selecting which authentication systems to combine. For example, a user may associate several authentication systems with particular resources, or the electronic device may instead automatically (e.g., as a default) assign particular authentication systems to particular resources.

FIG. 1 is a schematic view of an illustrative electronic device for use with an authentication system in accordance with one embodiment of the invention. Electronic device 100 may include processor 102, storage 104, memory 106, communications circuitry 108, input/output circuitry 110, authentication system 112 and power supply 114. In some embodiments, one or more of electronic device components 100 may be combined or omitted (e.g., combine storage 104 and memory 106). In some embodiments, electronic device 100 may include other components not combined or included in those shown in FIG. 1 (e.g., a display, bus, or input mechanism), or several instances of the components shown in FIG. 1. For the sake of simplicity, only one of each of the components is shown in FIG. 1.

Processor 102 may include any processing circuitry operative to control the operations and performance of electronic device 100. For example, processor 100 may be used to run operating system applications, firmware applications, media playback applications, media editing applications, or any other application. In some embodiments, a processor may drive a display and process inputs received from a user interface.

Storage 104 may include, for example, one or more storage mediums including a hard-drive, solid state drive, flash memory, permanent memory such as ROM, any other suitable type of storage component, or any combination thereof. Storage 104 may store, for example, media data (e.g., music and video files), application data (e.g., for implementing functions on device 100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that may enable electronic device 100 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 106 can include cache memory, semi-permanent memory such as RAM, and/or one or more different types of memory used for temporarily storing data. In some embodiments, memory 106 can also be used for storing data used to operate electronic device applications, or any other type of data that may be stored in storage 104. In some embodiments, memory 106 and storage 104 may be combined as a single storage medium.

Communications circuitry 108 can permit device 100 to communicate with one or more servers or other devices using any suitable communications protocol. Electronic device 100 may include one more instances of communications circuitry 108 for simultaneously performing several communications operations using different communications networks, although only one is shown in FIG. 1 to avoid overcomplicating the drawing. For example, communications circuitry 108 may support Wi-Fi (e.g., a 802.11 protocol), Ethernet, Bluetooth™ (which is a trademark owned by Bluetooth Sig, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof.

Input/output circuitry 110 may be operative to convert (and encode/decode, if necessary) analog signals and other signals into digital data. In some embodiments, input/output circuitry can also convert digital data into any other type of signal, and vice-versa. For example, input/output circuitry 110 may receive and convert physical contact inputs (e.g., from a multi-touch screen), physical movements (e.g., from a mouse or sensor), analog audio signals (e.g., from a microphone), or any other input. The digital data can be provided to and received from processor 102, storage 104, memory 106, or any other component of electronic device 100. Although input/output circuitry 110 is illustrated in FIG. 1 as a single component of electronic device 100, several instances of input/output circuitry can be included in electronic device 100.

Electronic device 100 may include any suitable mechanism or component for allowing a user to provide inputs to input/output circuitry 110. For example, electronic device 100 may include any suitable input mechanism, such as for example, a button, keypad, dial, a click wheel, or a touch screen. In some embodiments, electronic device 100 may include a capacitive sensing mechanism, or a multi-touch capacitive sensing mechanism. Some sensing mechanisms are described in commonly owned U.S. patent application Ser. No. 10/902,964, filed Jul. 10, 2004, entitled "Gestures for Touch Sensitive Input Device," and U.S. patent application Ser. No. 11/028,590, filed Jan. 18, 2005, entitled "Mode-Based Graphical User Interfaces for Touch Sensitive Input Device," both of which are incorporated herein in their entirety.

In some embodiments, electronic device 100 can include specialized output circuitry associated with output devices such as, for example, one or more audio outputs. The audio output may include one or more speakers (e.g., mono or stereo speakers) built into electronic device 100, or an audio component that is remotely coupled to electronic device 100 (e.g., a headset, headphones or earbuds that may be coupled to communications device with a wire or wirelessly).

In some embodiments, I/O circuitry 110 may include display circuitry (e.g., a screen or projection system) for providing a display visible to the user. For example, the display circuitry may include a screen (e.g., an LCD screen) that is incorporated in electronics device 100. As another example, the display circuitry may include a movable display or a projecting system for providing a display of content on a surface remote from electronic device 100 (e.g., a video projector). In some embodiments, the display circuitry can include a coder/decoder (Codec) to convert digital media data into analog signals. For example, the display circuitry (or other appropriate circuitry within electronic device 100) may include video Codecs, audio Codecs, or any other suitable type of Codec.

The display circuitry also can include display driver circuitry, circuitry for driving display drivers, or both. The display circuitry may be operative to display content (e.g., media playback information, application screens for applications implemented on the electronic device, information regarding ongoing communications operations, information regarding incoming communications requests, or device operation screens) under the direction of processor 102.

Authentication system 112 may include any suitable system or sensor operative to receive or detect an input identifying the user of device 100. For example, authentication system 112 may include a skin-pattern sensing mechanism, an optical system for identifying users based on their facial patterns, eye features (e.g., retinas), or vein patterns, or any other sensor for detecting any other unique biometric feature or attribute of a user. As another example, authentication system 112 may be operative to receive secret or confidential entries identifying the user (e.g., gestures on the device, or touching a particular pattern of objects or colors on a display). As still another example, authentication system 112 may be operative to detect particular movements or vibrations of the device caused by the user. Authentication system 112 may be combined or embedded in any other element of electronic device 112 (e.g., a display or a camera), or use events detected by various sensors of the electronic device (e.g., an accelerometer or proximity sensor). In some embodiments, several types of authentication systems may be combined or implemented in the electronic device.

In some embodiments, electronic device 100 may include a bus operative to provide a data transfer path for transferring data to, from, or between control processor 102, storage 104, memory 106, communications circuitry 108, input/output circuitry 110 authentication system 112, and any other component included in the electronic device.

To prevent unauthorized access to data or information stored in memory or storage, the electronic device may direct an authentication system to identify the user and authorize access to requested resources. The electronic device may require authorization prior to providing access to any electronic device resource. In some embodiments, the electronic device may require different levels of authorization before providing access to different applications or different data or files associated with different applications. For example, the electronic device may require a user to satisfy several authentication systems prior to providing access to an application or data (e.g., a secondary authentication, for example using biometrics, in addition to a first or initial authentication, for example a pass code used to unlock the device).

Figure 2:
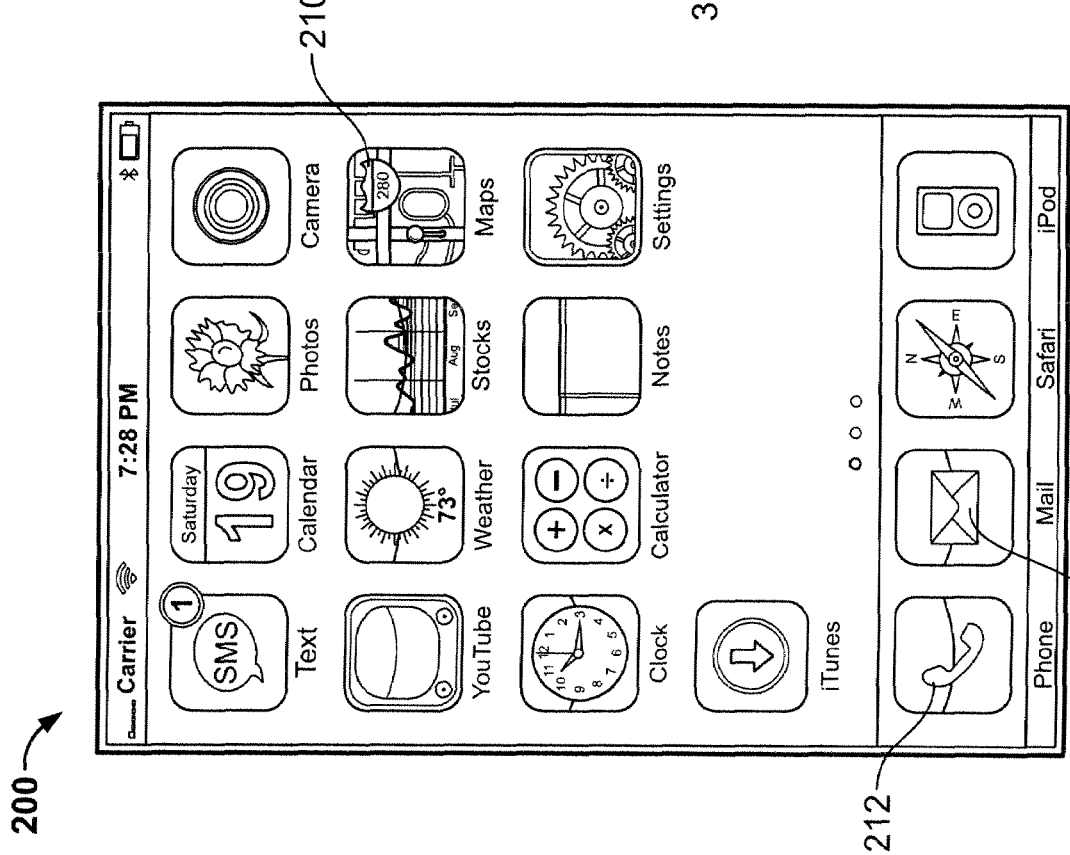
FIG. 2 is a schematic view of an illustrative display screen of an electronic device in accordance with one embodiment of the invention.

FIG. 2 is a schematic view of an illustrative display screen of an electronic device in accordance with one embodiment of the invention. Display screen 200 may be displayed in response to a user unlocking the electronic device. Display screen 200 may include selectable options 210 for accessing various device functions. For example, each option 210 may be associated with different applications available on the electronic device. As another example, each option may be associated with particular data or files available to the user. The electronic device may or may not require authentication to access display 200. For example, display 200 may include basic or default applications available to the user. As another example, display 200 may include default features available to all users.

In some embodiments, one or more applications may provide access to or use data or resources that are personal to one or more users. For example, options 212 and 214, associated with telephone and mail applications, respectively, may involve personal accounts or contacts that are not associated with every user of the electronic device. Prior to providing access to such applications, or to personal or confidential features or resources available via such applications, the electronic device may require the user to authenticate. In some embodiments, default features of applications may be available without authentication (e.g., allow all users to place telephone calls, but not to access a contact list).

Figure 3:
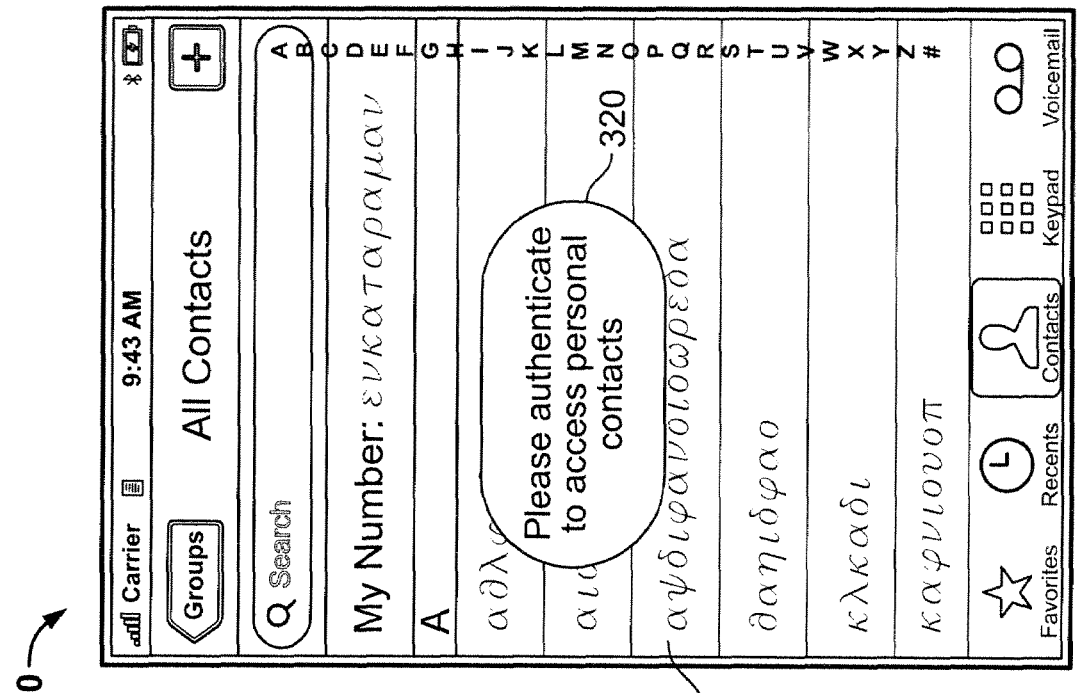
FIG. 3 is a schematic view of an illustrative display screen directing a user to authenticate in accordance with one embodiment of the invention.

FIG. 3 is a schematic view of an illustrative display screen directing a user to authenticate in accordance with one embodiment of the invention. Display screen 300 may be displayed in response to receiving an instruction from a user to access resources (e.g., information or an application) restricted by an authentication protocol. Display screen 300 may include information 310 associated with the selected resources. To prevent an unauthorized user from viewing the resources prior to authorization, information 310 may be blurred or hidden from view (e.g., entries in particular field may be unobtainable). In some embodiments, display screen 300 may instead include no information until the user is authenticated.

Display screen 300 may include notice 320 instructing the user to authenticate before accessing the requested resources. Notice 320 may include a pop-up, overlay, new display screen, or any other suitable type of display for providing an instruction to the user. Notice 320 may include any suitable instruction, including for example a manner in which the user is to authenticate (e.g., specifying a particular authentication system to use). For example, notice 320 may direct the user to provide a fingerprint or provide an input that matches a predefined visual or temporal pattern. Once the user authenticates properly, the electronic device may display information 310 in a manner discernable by the user, and enable selectable options or other functions associated with the selected resource.

In some embodiments, a user may be required to authenticate prior to unlocking the electronic device (e.g., prior to accessing any resource of the device). FIG. 4 is a schematic view of an illustrative display screen for directing a user to authenticate prior to accessing device resources in accordance with one embodiment of the invention. Display screen 400 may include option 410 for unlocking the display. For example, option 410 may include a slider operative to be dragged across a portion of the screen. As another example, option 410 may include an option or series of options for the user to select (e.g., simultaneously or sequentially press several keys or touch several areas of display screen 400).

Display screen 400 may include notice 420 directing the user to authenticate prior to accessing the device resources (e.g., the home screen from which information and applications are launched). Notice 420 may include any suitable type of notice, including for example a pop-up, overlay, new display screen, or any other suitable type of display for providing an instruction to the user. The electronic device may display notice 420 at any suitable time, including for example when the user turns on the device (e.g., and views display screen 400), in response to the user attempting to access device resources without first authenticating (e.g., as an error message), in response to a user request for help, or at any other suitable time. Notice 420 may include any suitable instruction, including for example a manner in which the user is to authenticate, a list of authorized users, or any other suitable information.

Once the user has been properly authenticated, the electronic device may display options associated with the authenticated user (e.g., options for applications purchased by particular users). In some embodiments, the electronic device may provide access to resources or content that was previously not available (e.g., contact lists or previous messages in a telephone or mail application). FIGS. 5A-C are schematic views of illustrative display screens associated with different users provided in response to authenticating the user in accordance with one embodiment of the invention. Display screen 500A may include several options 510A. The displayed options may include some options common to a default or basic display of the electronic device (e.g., display screen 500A shares options with display screen 200, FIG. 2). Display screen 500A may include several options 512A for additional applications or resources only available to the particular authenticated user. For example, display screen 510A may include additional options 512A for game, system and media applications.

Display screen 500B may include options 510B for resources or applications available to the users. In some embodiments, options 510B may be entirely different from the options of a default screen (e.g., display screen 500B shares no options display screen 200, FIG. 2). Display screen 500B may be further customized to not include labels identifying the applications or resources associated with options 510B.

Display screen 500C may include options 510C for resources or applications available to the users. In some embodiments, options 510C for the same resources as other display screens may have different appearances (e.g., different icons). For example, in FIG. 5C, the options displayed for the Mail, Clock, Photos, YouTube, and Calculator applications may be different than those displayed in display screen 500A of FIG. 5A. Display screen 500C may in addition include a custom or personal background 512C (e.g., different background image). In some embodiments, display screen 500C may not include a dock or other feature for maintaining some options 510C in a fixed position (e.g., unlike options 510B located in dock 512B).

In some embodiments, the electronic device may provide access to different amounts of electronic device resources based on the identity of the authenticated user. For example, if an electronic device is used by several users (e.g., parents and children in the same family), the users may share some but not all of the resources (e.g., all users may have access to the family contact list, but not to other family members' e-mail). As another example, users of the electronic device may be organized in groups or tiers of users. Some resources may be associated with groups or tiers or users, instead of or in addition to particular users. When a particular user is authenticated and identified as being part of a group, the electronic device may provide the user with access to the resources associated with the group (e.g., common or shared contacts, shared communications, or shared documents) and to the resources associated with the particular user (e.g., personal contacts, e-mail accounts, and telephone call lists).

The electronic device may associate particular resources with one or more authentication systems. For example, a user may identify a resource and provide a protect or secure instruction (e.g., by selecting an appropriate option). A user may in addition select one or more authentication systems to satisfy before providing access to the resource. If the resource is not public (e.g., not a default application or file to remain available to all users), or if the resource was created or purchased by the user, the electronic device may associate the selected resource with the one or more selected authentication systems. Alternatively, if the user has sufficient privileges (e.g., an administrator), any resource may be secured using one or more selected authentication systems.

The electronic device may not require a user to authenticate each time the user unlocks or operates the electronic device. In some embodiments, the electronic device may allow a user to authenticate for a particular amount of time. For example, once authenticated, the electronic device may allow a user to access restricted resources for 10 hours from the time the user authenticated. As another example, the electronic device may retain the user's authentication for a particular amount of time after having received the user's last instruction or having entered a stand-by mode (e.g., retain authentication for thirty minutes after an input). The amount of time the electronic device retains authentication information may be set by the device or by the user, and may be based on the particular types or resources protected by the authentication information (e.g., allow for a longer authentication period for access to a game purchased by a particular user than to a user's personal contacts). Not requiring the electronic device to authenticate each time the user operates the device may save power consumption.

The electronic device may use any suitable type of authentication system to prevent unauthorized access of device resources. In some embodiments, the electronic device may include an authentication system based on a user's unique skin patterns. For example, the electronic device may include an authentication system operative to detect a user's finger, hand, palm, knuckle print, or any other suitable print or skin feature unique to the user. The authentication system may include a sensor operative to detect the user's unique skin pattern or feature.

The sensor may include any suitable type of sensor for detecting unique features or patterns of a user's skin. For example, the sensor may include an optical scanner operative to detect features of the user's skin. The optical sensor may include a charge coupled device, or any other suitable array of light-sensitive components (e.g., diodes) operative to record the light received by the sensor (e.g., a charge coupled device). For example, if a charge coupled device includes an array of light-sensitive components, the optical sensor may be operative to record, for each light sensitive component of the array, a pixel representing the light received by the particular light sensitive component. The value of each pixel may then reflect the distance from the sensor of the particular portion of the user's skin associated with the pixel (e.g., a ridge or valley). The recorded pixels may form an image, for example of a particular portion of the user's skin, that the electronic device can compare to a library of images associated with authorized users.

As another example, the sensor may include a capacitive sensor operative to detect features of a user's skin. The capacitive sensor may include one or more chips containing an array of cells, each of which may include at least two conductor plates separated by an insulating layer. The sensor may be coupled to an inverting amplifier operative to change the voltage between the at least two conductor plates of each cell in the chip. When a user's finger is placed over the array of cells, the sensor may be operative to distinguish the cells over which a valley (e.g., a fingerprint valley) and a ridge (e.g., a fingerprint ridge) are placed from the different capacitance values of each cell (i.e., cells under a valley will have a lower capacitance than cells under a ridge). Using the detected capacitance values of each cell in the chip, the sensor may generate an image or a representation of the skin placed over the sensor that can be compared to a library of images or representations available to the electronic device.

The authentication system may include any suitable countermeasure for preventing an unauthorized user from spoofing an authorized user's skin patterns, for example by placing an image (e.g., a printed image) or a three-dimensional structure (e.g., a polymer cast) adjacent to the authentication system sensor. For example, the authentication system may include a combination of optical and capacitance sensors, a sonar or radio-frequency sensor, a sensor for detecting a user's pulse, a heat sensor for determining the temperature of the object placed against the sensor (e.g., to determine if the temperature is within a range of expected human skin temperatures), or any other suitable countermeasure.

The sensor may be operative to detect features of the user's skin using any suitable approach. In some embodiments, the sensor may be operative to detect features of the user's skin when the user's skin is moved over the sensor. For example, the sensor may include a one-dimensional sensor or stagnant sensor (e.g., a line of sensing components) operative to detect features of a user's finger as it slides or rolls over the sensor. The sensor may include an orientation in which the user's skin is to move to provide an accurate representation of the user's skin features. For example, the sensor may require a user to move a fingertip along the axis of the finger or perpendicular to the axis of the finger.

In some embodiments, the sensor may be operative to detect features of the user's skin when the skin is held immobile over the sensor. For example, the sensor may include a two-dimensional sensor or moving sensor operative to detect features of the user's finger when the finger is stationary over the sensor. The sensor may be operative to move at a regular pace or speed under the user's immobile finger, or detect an instantaneous or near-instantaneous two-dimensional representation of the user's finger at a point in time (e.g., as the user's finger moves over the sensor). Using a two-dimensional sensor may provide a more accurate representation of the user's skin features, as a two-dimensional sensor does not depend on the user moving his skin over the sensor at a regular or even pace, unlike a one-dimensional sensor.

Figure 6:
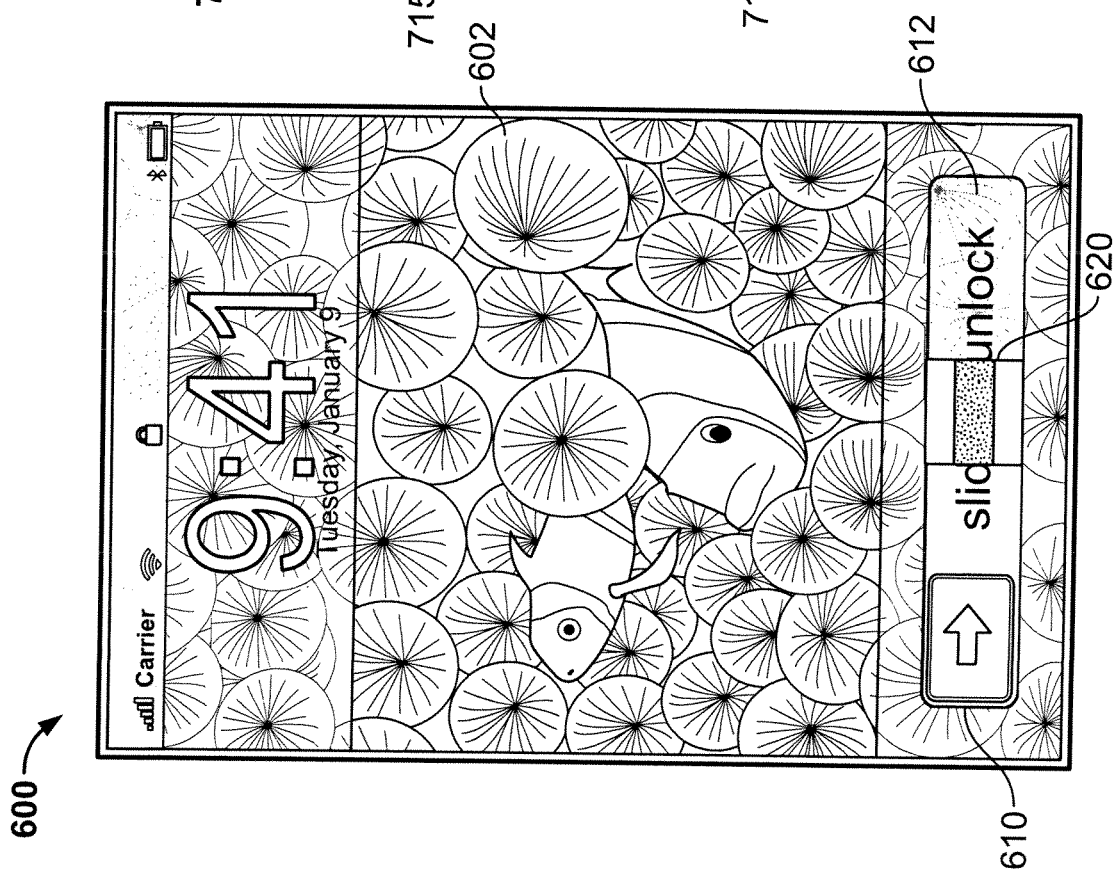
FIG. 6 is a schematic view of an illustrative electronic device display for detecting a user's fingerprint in accordance with one embodiment of the invention.

The sensor may be placed at any suitable location within the electronic device. In some embodiments, the sensor may be placed such that it is operative to detect an appropriate portion of the user's skin as the user operates or begins to operate the electronic device. The sensor position may vary based on the portion of the user's skin to be detected (e.g., finger, hand or palm). FIG. 6 is a schematic view of an illustrative electronic device display for detecting a user's fingerprint in accordance with one embodiment of the invention. Display 600 may include screen 602 instructing the user to unlock the electronic device. For example, screen 602 may include block 610 having an arrow instructing the user to slide block 610 along track 612 to unlock the electronic device, for example by placing a finger on block 610 and dragging the finger along track 612.

To authenticate the user during the unlocking process, display 600 may include sensor 620 in the display along track 612. For example, sensor 620 may be embedded in the display stack (e.g., among the display stack that may include a capacitance sensing component, a light source, and a display surface). As another example, sensor 620 may be placed underneath the display stack. As still another example, sensor 620 may include an existing component of the display stack (e.g., the display stack for a touch screen display may include a capacitance sensor). In such an approach, the authentication system may use the detected output of a capacitance sensing component of the display stack (e.g., in a touch screen display) that has a sufficient resolution for distinguishing ridges and valleys of a user's skin. In some embodiments, the capacitance sensing component of the display stack may include several types or densities of capacitance sensing components to allow for authentication using particular portions of the display (e.g., use very fine sensing components in the display stack along at least a portion of track 612 for authentication and less fine sensing components in the remaining areas of display 600).

In some embodiments, sensor 620 may be embedded in the electronic device such that it is not visible in display 600. For example, sensor 620 may be assembled, printed or etched directly on display 600 (e.g., etched on glass) such that the user cannot see the fingerprint scanner. If a user has difficulty providing a suitable fingerprint to sensor 620, display 600 may highlight the outlines of sensor 620 (e.g., display an icon directing the user to place a finger on the icon over sensor 620) to assist the user in authenticating.

Figure 7:
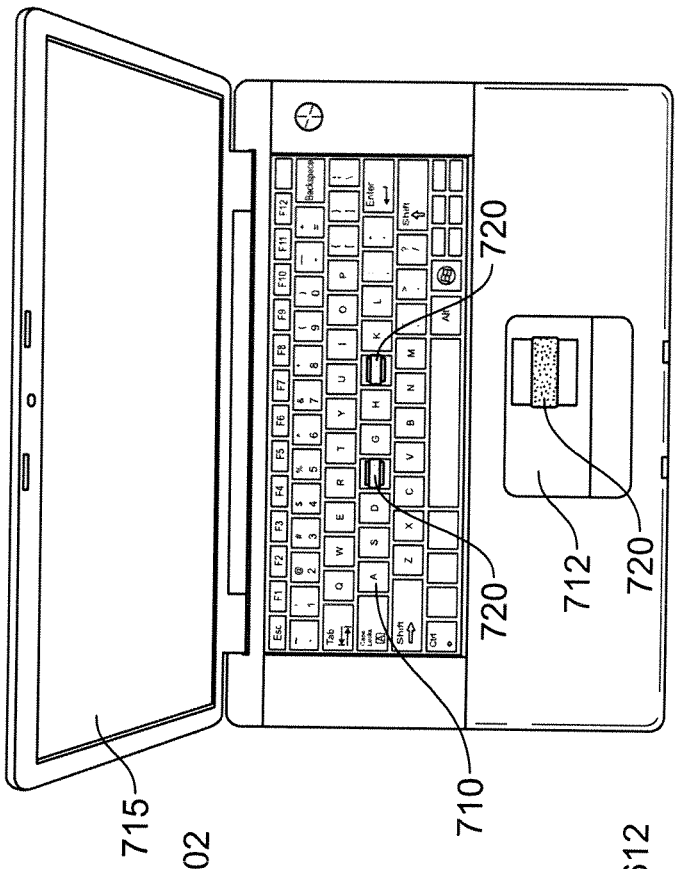
FIG. 7 is a schematic view of another illustrative electronic device for detecting a user's fingerprint in accordance with one embodiment of the invention.

FIG. 7 is a schematic view of another illustrative electronic device for detecting a user's fingerprint in accordance with one embodiment of the invention. Electronic device 700 may include input mechanisms 710 and 712 that the user may actuate to provide inputs to electronic device 700. For example, input mechanism 710 may include a keyboard, and input mechanism 712 may include a touchpad or track pad. It will be understood, however that any other input mechanism, including input mechanism remotely coupled to electronic device 700 (e.g., a wired or wireless mouse) may be used with electronic device 700.

To provide for secure access to resources, electronic device 700 may include at least one sensor 720 operative to detect features of a user's fingerprint to identify the user. To provide a seamless user experience, the sensors 720 may be embedded in or under at least one of input mechanism 710 and 712. In some embodiments, input mechanism 710, which may include several distinct keys that a user may press to provide inputs to electronic device 700, may include a sensor 720 embedded in one or more keys. For example, an optical or capacitive sensor may be placed at the top surface of a key such that when a user places a finger on the key (e.g., rests his index fingers on the "F" or "J" keys), the sensor may detect features of the user's fingertips for authenticating the user. A two-dimensional or moving sensor may be used for this implementation to authenticate the user while the user's fingers are placed over the keys.

A sensor 720 may be placed in, adjacent to or behind any button or other physical input that a user may press in an electronic device. For example, a sensor 720 may be placed behind a home button of a portable media player or cellular telephone (e.g., button 812, FIG. 8B). Sensor 720 may be placed between an outer cover or surface (e.g., a glass or plastic surface) and a mechanical component operative to interact with a switch or electronic circuit. For example, an fingerprint sensing mechanism may be embedded underneath a transparent surface operative through which the sensing mechanism may detect a user's fingerprint ridges and valleys. In some embodiments, no additional transparent surface may be necessary (e.g., if the sensing mechanism includes a surface on which a user may place a finger).

In some embodiments, input mechanism 712 may include a sensor 720 embedded underneath some or all of the pad such that when a user places a finger on input mechanism 712 (e.g., to move an indicator on display 715), sensor 720 may detect the features of the user's finger for authenticating the user. Sensor 720 used may be a one-dimensional sensor, authenticating the user as the user moves his fingers across the pad, or a two-dimensional sensor operative to authenticate the user when the user's finger is immobile on the pad (e.g., when the user first places his finger on the pad). Sensor 720 may cover the entire surface of input mechanism 712 such that the user need not place his fingers over a particular portion of input mechanism 712 to be authenticated. Electronic device 700 may be operative to identify the position of each sensor 720 to assist the user in providing an adequately detectable input, for example using a highlight, indication on the display, or any other suitable approach. In some embodiments, any other suitable input mechanism may include a sensor 720 operative to seamlessly detect the user's fingerprint features (e.g. a button, wheel, key or screen).

Figures 8A, 8B:
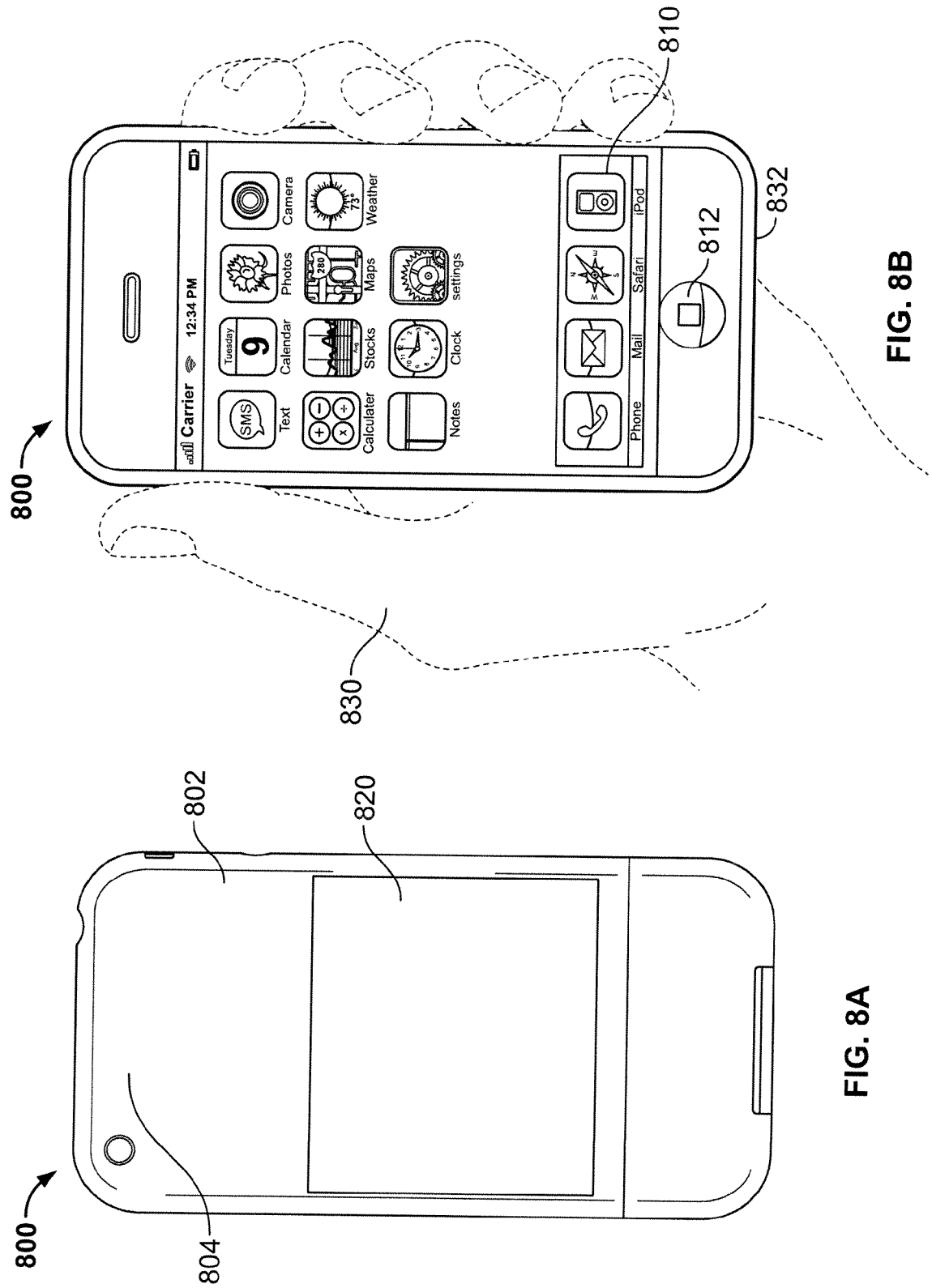
FIGS. 8A and 8B are schematic views of an illustrative electronic device for detecting a user's handprint in accordance with one embodiment of the invention.

FIGS. 8A and 8B are schematic views of an illustrative electronic device for detecting a user's handprint in accordance with one embodiment of the invention. Electronic device 800 may include housing 802 operative to retain display 810. Housing 802 may substantially constitute the back surface of electronic device 800 (e.g., the surface that does not include display 810) to protect the components of the electronic device. When a user holds electronic device 800, the user's hand 830 may be cupped around housing 802 leaving display 810 visible such that at least the user's palm 832 is placed against back surface 804, as shown in FIG. 8B. Electronic device 800 may include sensor 820 embedded in back surface 804 and operative to detect features of a user's palm or hand. By placing sensor 820 on back surface 802 (or any surface of the electronic device that is opposite the surface of display 810), sensor 820 may authenticate the user when the user holds electronic device 800. Sensor 820 may include a two-dimensional sensor, thus allowing electronic device 800 to seamlessly authenticate the user without requiring the user to move or slide a hand against back surface 804.

Figure 9:
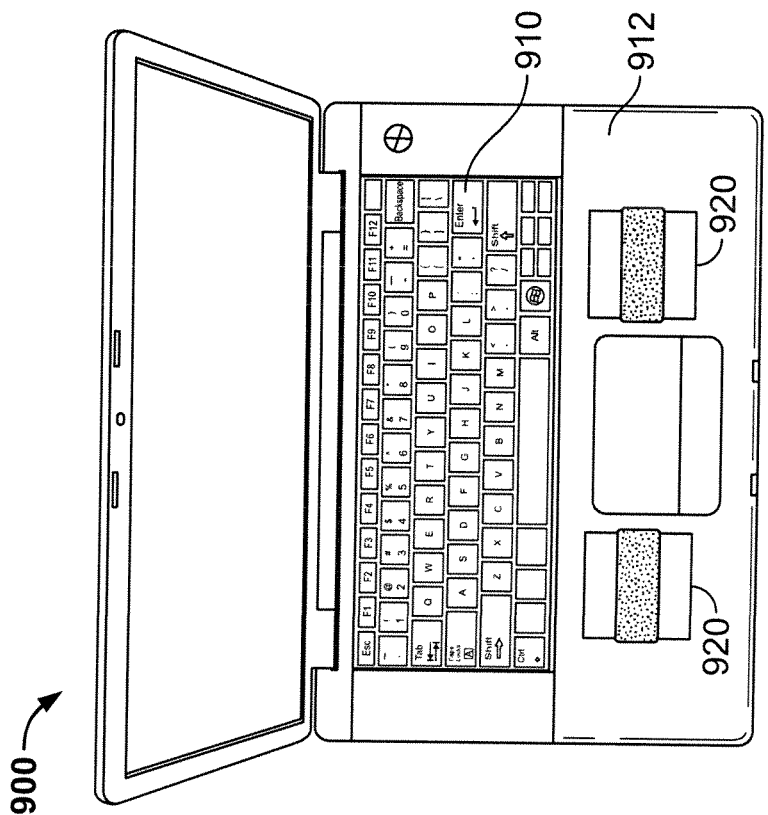
FIG. 9 is a schematic view of an illustrative electronic device for detecting a user's hand print in accordance with one embodiment of the invention.

FIG. 9 is a schematic view of an illustrative electronic device for detecting a user's hand print in accordance with one embodiment of the invention. Electronic device 900 may include input mechanism 910 with which a user may provide inputs to the device. Input mechanism 910 may be positioned such that a user's fingers are placed over input mechanism 910 while the user's palms and wrists are placed on or extend over housing 912. Electronic device 900 may include one or more sensors 920 embedded in or placed on housing 912 to authenticate a user of the device. Sensors 920 may be located such that the user's hands, palms or wrists are aligned with sensors 920 when the user places his hands over housing 912 to operate input mechanism 910. Sensors 920 may be operative to detect features of the user's skin when the user's hands are placed over housing 912, for example using a two-dimensional sensor.

In some embodiments, the authentication system may instead or in addition include a sensing mechanism for detecting features underneath a user's skin. For example, the authentication system may include a sensor operative to detect the pattern of a user's veins, arteries, follicle distribution, or any other suitable feature underneath the user's skin that may be detected. The sensor may include any suitable type of sensor, including for example an optical sensor (e.g., a camera) located on the surface of the electronic device. The sensor may be positioned so as to detect a feature underneath any suitable portion of the user's skin when the electronic device is in use. For example, the sensor may be positioned to detect features underneath a user's skin in an area of the user's fingers, hand, wrist, arm, face, or any other suitable area.

Figure 10:
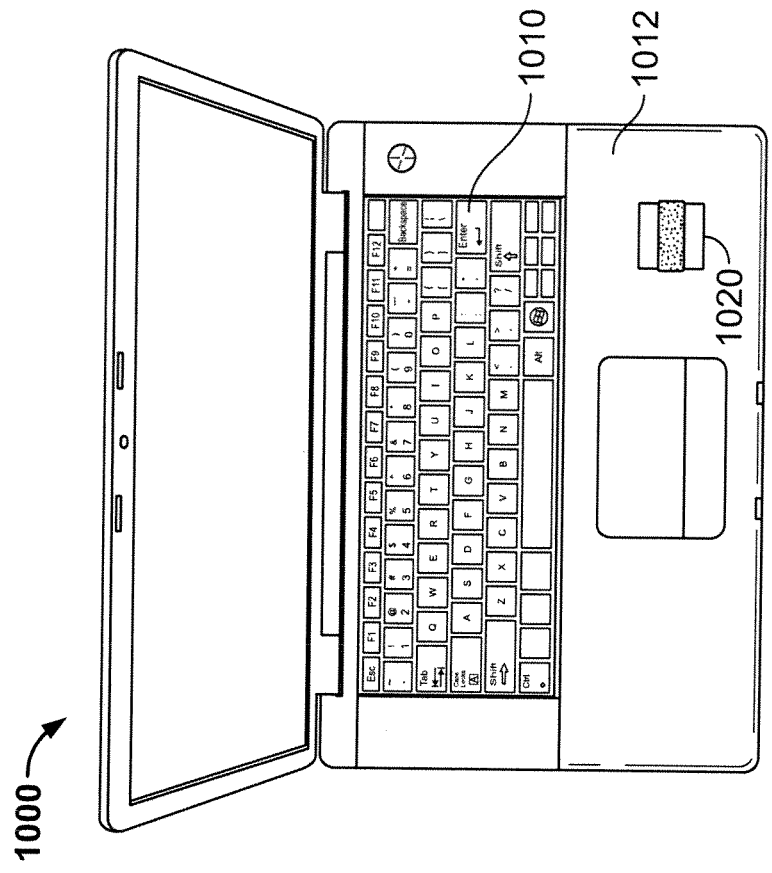
FIG. 10 is a schematic view of an illustrative device having a sensor operative to detect features underneath a user's skin in accordance with one embodiment of the invention.

FIG. 10 is a schematic view of an illustrative device having a sensor operative to detect features underneath a user's skin in accordance with one embodiment of the invention. Electronic device 1000 may include input mechanism 1010 located on or extending through a portion of housing 1012. Input mechanism 1010 may be configured such that when in use, a user's hands and wrists are placed over housing 1012 (e.g., instead of over input mechanism 1010). Electronic device 1000 may include sensor 1020 operative to detect features underneath a user's skin. For example, sensor 1020 may include an optical sensor operative to detect a user's vein patterns near the user's wrists. Sensor 1020 may be located on any suitable surface of electronic device 1000, including for example on or embedded in housing 1012 such that the user's wrists may be adjacent to sensor 1020 when the user's hands are positioned to provide an input using input mechanism 1010. Such a positioning may allow for a seamless authentication of the user by detecting features underneath the user's skin (e.g., a vein pattern by the user's wrist) while the user operates device 1000.

In some embodiments, the authentication system may instead or in addition include a sensor operative to detect features of the user's face. For example, the authentication system may include a sensor operative to detect radiation emitted or reflected by one or more distinctive features of the user's face when the user's face is placed opposite the sensor. The sensor may be operative to detect any suitable type of radiation. For example, the sensor may include a light sensor (e.g., a camera), an infra-red sensor, an ultra-violet sensor, a scanning laser, an ultrasound sensor (e.g., sonar), or any other sensor operative to detect a desired radiation (e.g., a particular range of radiation frequencies or periods).

The authentication system may be operative to detect any suitable element of the user's face. For example, the authentication system may identify faces by analyzing the relative to position and size of a user's head, nose, mouth, ears, cheekbones, jaw, or any other attribute of the user's face. As another example, the authentication system may identify features of the user's face using a three-dimensional authentication system to capture and analyze curved surfaces or depths of a user's facial features (e.g., contour of eye sockets, chin or nose). As still another example, the authentication system may detect unique lines, patterns or spots of the user's skin (e.g., using skin texture analysis). To enhance or facilitate authentication, combinations of these approaches may be used.

Figure 11:
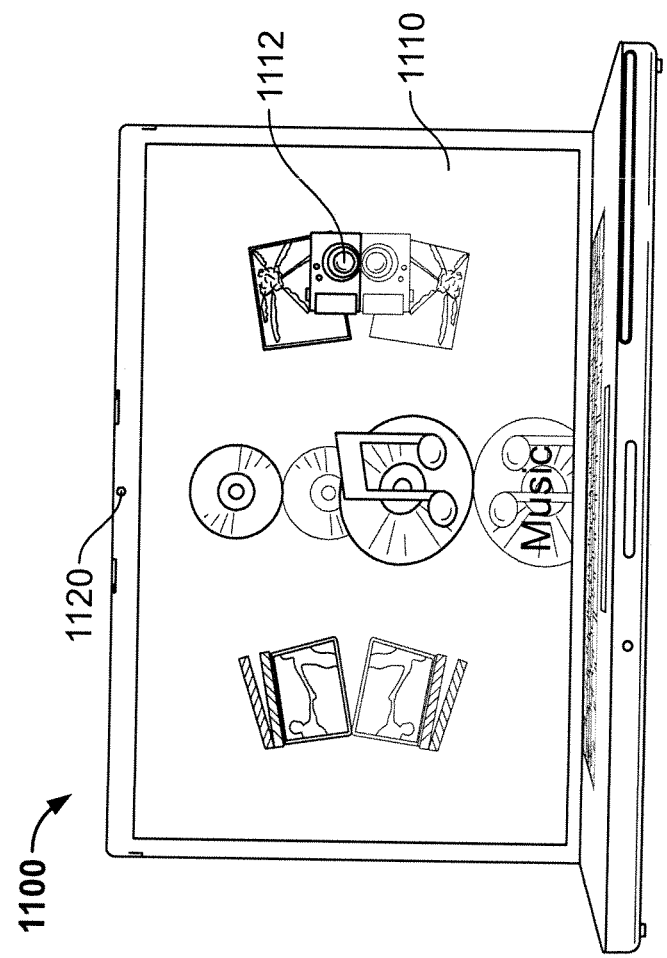
FIG. 11 is a schematic view of an illustrative electronic device having a sensor for detecting features of a user's face in accordance with one embodiment of the invention.

The sensor for detecting features of the user's face may be located at any suitable position on the electronic device. In some embodiments, the sensor may include a camera or other sensor provided with the electronic device for a different purpose (e.g., an embedded webcam for chatting). FIG. 11 is a schematic view of an illustrative electronic device having a sensor for detecting features of a user's face in accordance with one embodiment of the invention. Electronic device 1100 may include sensor 1120 located adjacent to display 1110 such that the user's face, and the features of interest of the user's face may be aligned with sensor 1120 (e.g., in the field of view of sensor 1120) when the user faces display 1110 to view or access electronic device resources. In response to detecting a user's face opposite sensor 1120, electronic device 1100 may direct sensor 1120 to capture and analyze features of the user's face, and compare the analyzed features with a library of features associated with authorized users. If an authorized user is detected, electronic device 1100 may display or provide access to restricted content 1112 on display 1110.

In some embodiments, the authentication system may instead or in addition include a sensor operative to authenticate a user based on attributes of the user's eyes. For example, the sensor may be operative to scan a user's retina, iris or retinal blood vessels to detect unique patterns of the user. The sensor may include a light source operative to emit light, for example infrared light, to be reflected by the user's eye and detected by a lens or optical sensor. The sensor may analyze the received light to create a representation of the user's eyes that can be compared with a library of authorized user's eyes.

As another example, the sensor may instead or in addition be operative to detect movements of the user's eyes, for example by tracking the position and movement of a user's retina, iris, blood vessels, or any other feature of the user's eyes. Before providing a user with access to electronic device resources, the electronic device may direct the sensor to detect a predetermined eye movement set up by an authorized user. For example, each authorized user may create an eye movement track by moving his eyes in a particular manner (e.g., up, down, left, right, blink, blink) while looking at the sensor. When a user of the device moves his eyes in a manner that matches a predetermined eye movement, the electronic device may unlock the device or provide access to restricted resources.

Figure 12:
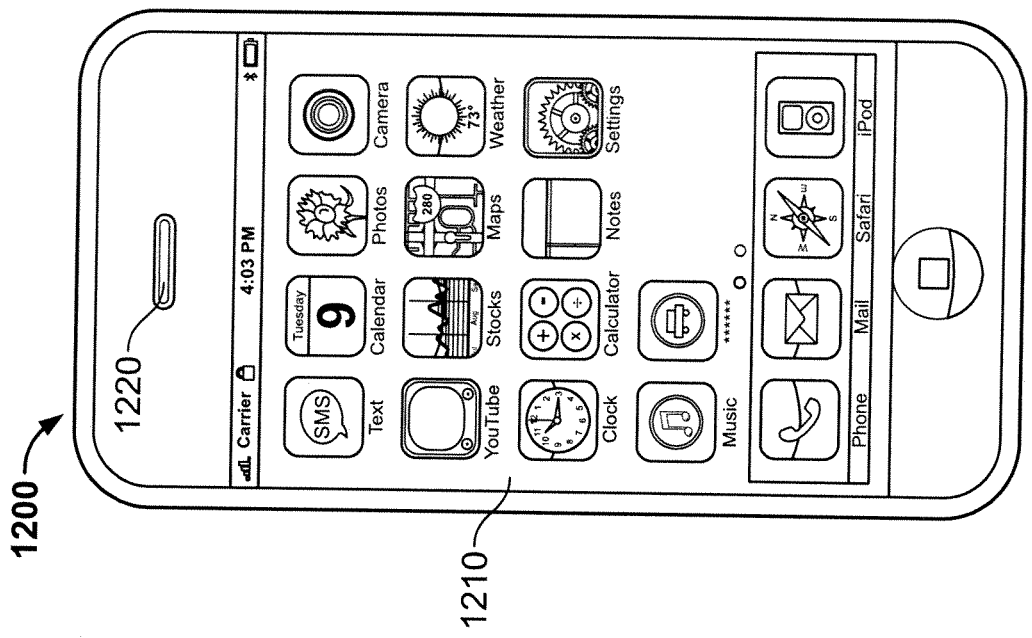
FIG. 12 is a schematic view of an illustrative electronic device having a sensor for detecting features of a user's eyes in accordance with one embodiment of the invention.

The sensor may be located at any suitable position of the device, including for example adjacent to a display or other portion of the device that will face the user's eyes (e.g., a position similar to that of sensor 1120, FIG. 11, which may be used to authenticate a user from features of the user's eyes). FIG. 12 is a schematic view of an illustrative electronic device having a sensor for detecting features of a user's eyes in accordance with one embodiment of the invention. Electronic device 1200 may include sensor 1220 located adjacent to display 1210 such that the user's eyes may be aligned with sensor 1220 (e.g., in the field of view of sensor 1220) when the user faces display 1210 to view or access electronic device resources. Using sensor 1220, electronic device 1200 may detect features or movements of a user's eyes to authenticate the user and provide access to restricted device resources. In some embodiments, sensor 1220 may be implemented to authenticate a user based on features of the user's face (e.g., like sensor 1120, FIG. 11).

In some embodiments, the authentication may be operative to authenticate users based on attributes or qualities of their voices. For example, the authentication system may be operative to detect a particular voice pitch or voice signature. The authentication system may be text dependent (e.g., the user must say a particular phrase to authenticate, such as "my voice is my passport") or text independent (e.g., any suitable words may be said to authenticate the user). In some embodiments, the authentication system may require the user to say a secret password to authenticate, thus requiring both knowledge of the user's password and the user's voice pitch to properly authenticate. The authentication system may include any suitable component for authenticating a user, including for example a microphone. In some embodiments, the microphone may be primarily used for other purposes (e.g., telephone communications or video conferencing). In some embodiments, other types of authentication systems may be used. In some embodiments, the authentication system may be operative to identify and authenticate users from the shape of their ear canals. For example, the authentication system may include a sensor (e.g., optical, radar or sonar) operative to detect unique features of a user's ear canal (e.g., shape and length). The sensor may be located, for example, near a speaker of the device (e.g., if the device is a telephone). In some embodiments, the authentication system may be operative to identify a user based on an odor particular to the user. For example, the authentication system may include a sensor operative to detect unique attributes of the odor of a user's skin or sweat glands. The sensor may be located at any suitable position on the device, including for example at or near an input mechanism (e.g., where the user touches the device).

In some embodiments, the authentication system may be operative to identify a user based on a DNA sequence. For example, the authentication may include a sensor coupled to a processor that is operative to receive a cell having the user's DNA (e.g., from the user's skin or mouth) and determine whether a particular DNA sequence is present. The length or variation in DNA sequence may be selected to both ensure that proper authentication is provided and that the authentication process is sufficiently quick (e.g., the entire DNA strand need not be analyzed). The sensor may be positioned at any suitable location on the device, including for example on or adjacent to input mechanisms or other components that a user may touch.

The electronic device may receive biometric information reflecting authorized users using any suitable approach. For example, when a user selects an authentication system to use with particular device resources, the electronic device may direct the user to provide biometric information (e.g., a fingerprint, eye scan, or DNA sequence) to be stored in a library. The electronic device may direct the user to provide the biometric input using any suitable approach, including for example using visual cues, audio cues, and highlighting or identifying the location of the authentication system sensor. Received biometric information stored in the library may be retrieved when a user attempts to authenticate, and compared to the biometric information provided by the user. If the provided biometric authentication information matches information stored in the library (e.g., information associated with a requested resource), the electronic device may provide access to a restricted resource. In some embodiments, a similar approach may be used to receive non-biometric authentication information.

In some embodiments, the authentication system may instead or in addition not require biometric parameters to provide access to electronic device resources to users. Although non-biometric authentication systems may be, in some cases, easier to circumvent than biometric authentication systems, the non-biometric authentication systems may nevertheless be highly effective and secure. In some embodiments, the authentication system may provide access to electronic device resources in response to detecting that a key or token is within a particular distance of the electronic device. For example, a user may have a cellular telephone and a computer. One or both devices may include circuitry for detecting that the devices are within a particular range of each other (e.g., 5 feet so that a user may sit at a desk to use the computer with the cellular telephone in his pocket and authenticate). When the devices determine that they are in proximity, resources of one or both devices may become available. This approach may be particularly useful to secure access to static devices while taking advantage of the fact that a user may keep a portable device on his person. This and other embodiments are described in more detail in commonly owned U.S. patent application Ser. No. 11/823,656, filed Jun. 27, 2007.

Figure 14:
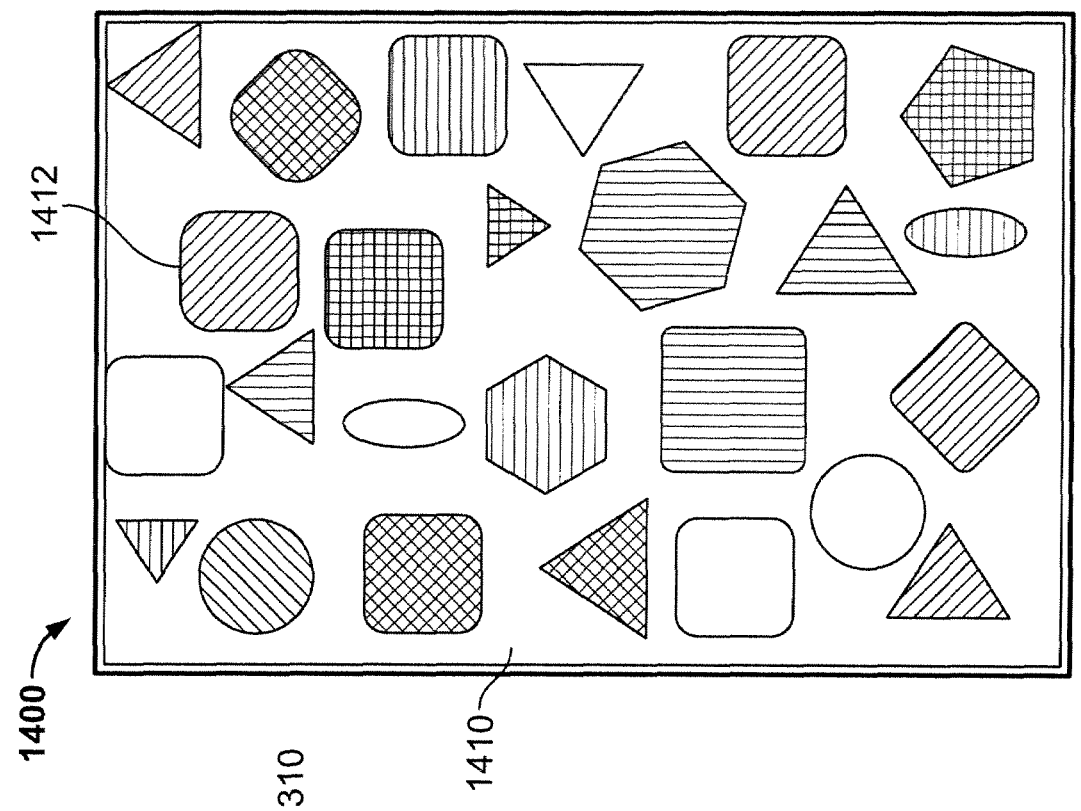
FIGS. 13 and 14 are schematic views of an illustrative display for providing a visual pattern in one embodiment of the invention.
Figure 13:
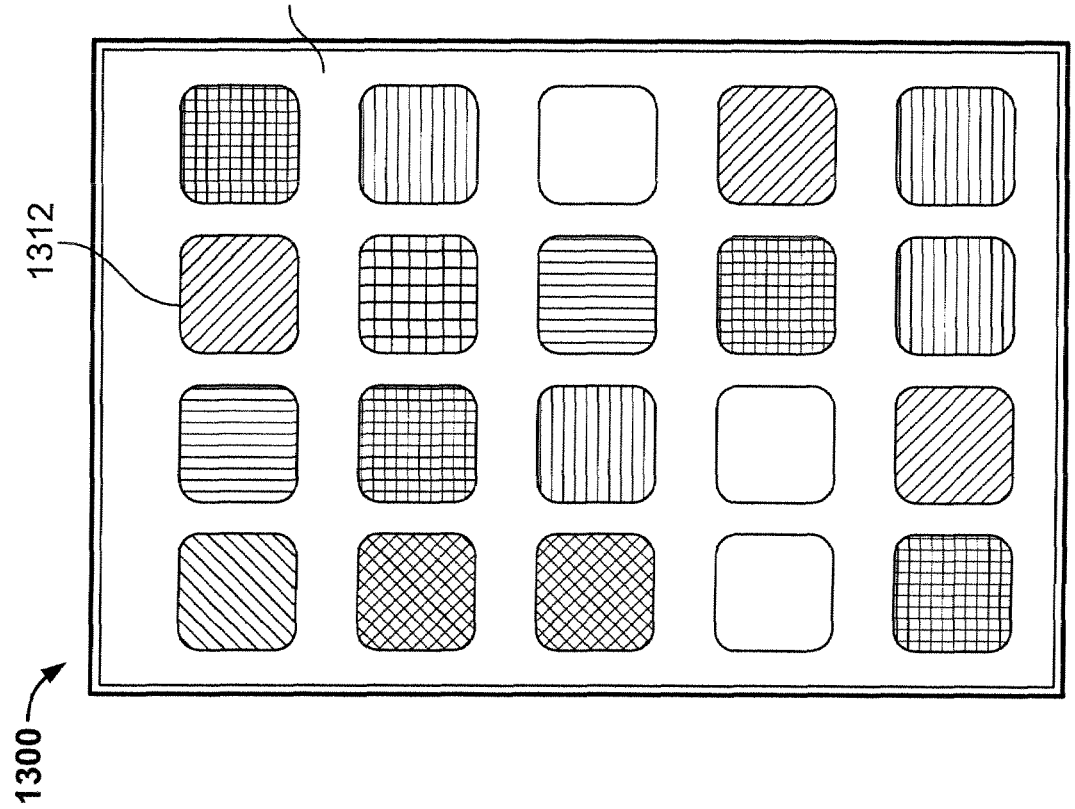

In some embodiments, the electronic device may authenticate a user based on a particular sequence of inputs provided by the user. For example, the electronic device may require the user to provide an input corresponding to a visual pattern provided by the electronic device. FIGS. 13 and 14 are schematic views of an illustrative display for providing a visual pattern in one embodiment of the invention. Display 1300 may include distribution 1310 of options or shapes 1312. Display 1400 may include distribution 1410 of options or shapes 1412. Each shape 1312 and 1412 may have a different fill pattern (e.g., different line orientations), color or colors, shape or contour, size (e.g., periphery or area), proximity to or position relative to other displayed shapes, alignment with other shapes (e.g., select four yellow shapes that form a straight line), source (e.g., shapes representing pictures in a particular album or library), or any other suitable characteristic. Distributions 1310 and 1410 may include any suitable number and distribution of shapes, including for example a number of evenly distributed shapes (e.g., 20 evenly distributed shapes 1310) or a seemingly arbitrary distribution of shapes (e.g., arbitrarily distributed shapes 1410).

To authenticate, the user may select (e.g., as detected by an input mechanism or other sensor) any suitable subset of the displayed shapes or options. The subset may include some or all of the shapes that share one or more attributes. For example, the user may select some or all of the shapes that are of a particular color (e.g., all shapes that include a shade of yellow). As another example, the user may select some or all shapes that have the same contour (e.g. all squares). As still another example, the user may select some or all shapes that have a particular attribute in common (e.g., all 5-sided shapes, or all shapes representing pictures associated with a particular album stored by the device). As yet still another example, the user may select some or all shapes that include a particular distribution of colors (e.g., shapes that include a red portion adjacent to a blue portion). Any suitable criteria or attribute (including combinations of the examples listed above, such as selecting the top two blue shapes and the bottom two square shapes) may be used to select the particular subset of displayed shapes.

Any suitable number of shapes or options may be associated with the subset to select for authentication. For example, the number of shapes may be related to the total number of displayed shapes (e.g., select 20% of the displayed shapes). As another example, the number of shapes may be a fixed number, for example less than five (e.g., so that the user can simultaneously select all shapes using one hand) or ten (e.g., so that the user can simultaneously select all shapes using both hands). The number of shapes may be selected to optimize security (e.g., require enough shapes that it is too difficult to simply guess which shapes to select).

The user may select the subset of the shapes using any suitable approach. If a multi-touch display is provided, the authentication system may require the user to simultaneously select all of the shapes used for authentication. As another example, the authentication system may allow the user to sequentially select the shapes used for authentication. The shapes may be selected in an arbitrary or particular order (e.g., from top to bottom or left to right). As still another example, the authentication system may require the user to provide a single, moving input (e.g., dragging a finger across the display) selecting only the shapes of the authorized subset. Any other suitable approach for selecting the subset of shapes may be used.

To avoid having the user always select shapes displayed in the same relative position on the display (e.g., like entering a numeric pass code using a displayed keypad), the electronic device may change the distribution of the shapes to select for authentication. To authenticate, the user may then identify the shapes that share the attribute associated with the authentication protocol. Because the position of the shapes used to authenticate may change each time the user accesses device resources, someone looking over the user's shoulder to see the general distribution of the selected shapes may not be able to select shapes with the same distribution to authenticate (e.g., the striped shapes may not be distributed in the same areas of the device).

After each failed attempt at selecting shapes for authentication, the electronic device may change the distribution of the displayed shapes, or even change the shapes (e.g., use different colors or contours) to prevent an unauthorized user from guessing the proper subset of shapes. The electronic device may lock the device resources after a particular number of failed attempts to select the proper subset of shapes. Once locked, a user may need to couple the device with a host to re-enable the device (e.g., couple a mobile device to a fixed device) or use another authentication system (e.g., a biometric system) to re-enable the device.

In some embodiments, rather than selecting particular shapes, the user may simply select the shapes located in pre-determined portions of the screen. For example, the user may place one or more fingers over several shape positions independent of the actual displayed shape. As another example, the user may place one or more fingers over particular shapes displayed by the electronic device, and move the one or more fingers in a predetermined manner (e.g. slide one or more fingers), independent of the displayed shapes. As still another example, the user may successively select several shapes located at predetermined positions on the display (e.g., select shapes at particular locations to form a predetermined pattern). The electronic device may, in some embodiments, provide a blank or uniform display on which the user may draw one or more patterns using one or more fingers. Such an approach may confuse or distract unauthorized users by creating a visual distraction via the displayed shapes.

In some embodiments, the electronic device may authenticate a user based instead or in addition on a received temporal pattern of inputs by the user. For example, the user may provide a particular number of inputs at a particular rate to authenticate. The electronic device may detect the inputs using any suitable approach. For example, the electronic device may detect inputs provided using an input mechanism of the device (e.g., inputs received by a touch screen). As another example, the electronic device may detect inputs from motion, contacts, vibrations or other impacts detected by an appropriate sensor of the device (e.g., an accelerometer). In such an approach, a user may tap any portion of the device (or a body in contact with the device, such as a table on which the device is placed) such that the sensor in the device detects the taps and determines whether they correspond to an authorized temporal pattern. As still another example, the electronic device may detect that it has been moved in a particular manner (e.g., shaken twice then spun) using a sensor in the device (e.g., an accelerometer or gyroscope). In response to detecting a correct temporal pattern, the electronic device may provide access to restricted resources.

In some embodiments, the authentication system may combine temporal and visual patterns for authentication. For example, a user may be required to select particular displayed shapes at a certain rate (e.g., the first two shapes quickly, then a pause before simultaneously selecting the last two). As another example, the user may be required to first select the proper shapes then provide an input for a temporal pattern. As still another example the user may be required to select one or more shapes and move the device (e.g., shake the device). Any other suitable combination of inputs may be required for authentication.

The electronic device may set up visual or temporal patterns for authorized users using any suitable approach. In some embodiments, when a user selects to use a temporal or visual pattern to restrict access to particular device resources, the electronic device may direct the user to provide or select the temporal or visual pattern. For example, the electronic device may provide a list of shape attributes that the user may select to form a pattern (e.g., a color or a contour). As another example, the electronic device may direct the user to select displayed shapes or provide a temporal pattern, and extract or identify the pattern from the received inputs. The electronic device may direct the user to provide a pattern several times before it is accepted to ensure that the user intended and remembers the selected pattern.

The electronic device may include any suitable number and types of authentication systems. For example, the electronic device may include one, more or all of the authentication systems or authentication approaches described above. Access to different resources may be restricted using one or more authentication systems, which a user may select or set up. In some embodiments, several authentication systems may be used sequentially before access to particular restricted resources is provided.

Figure 15:
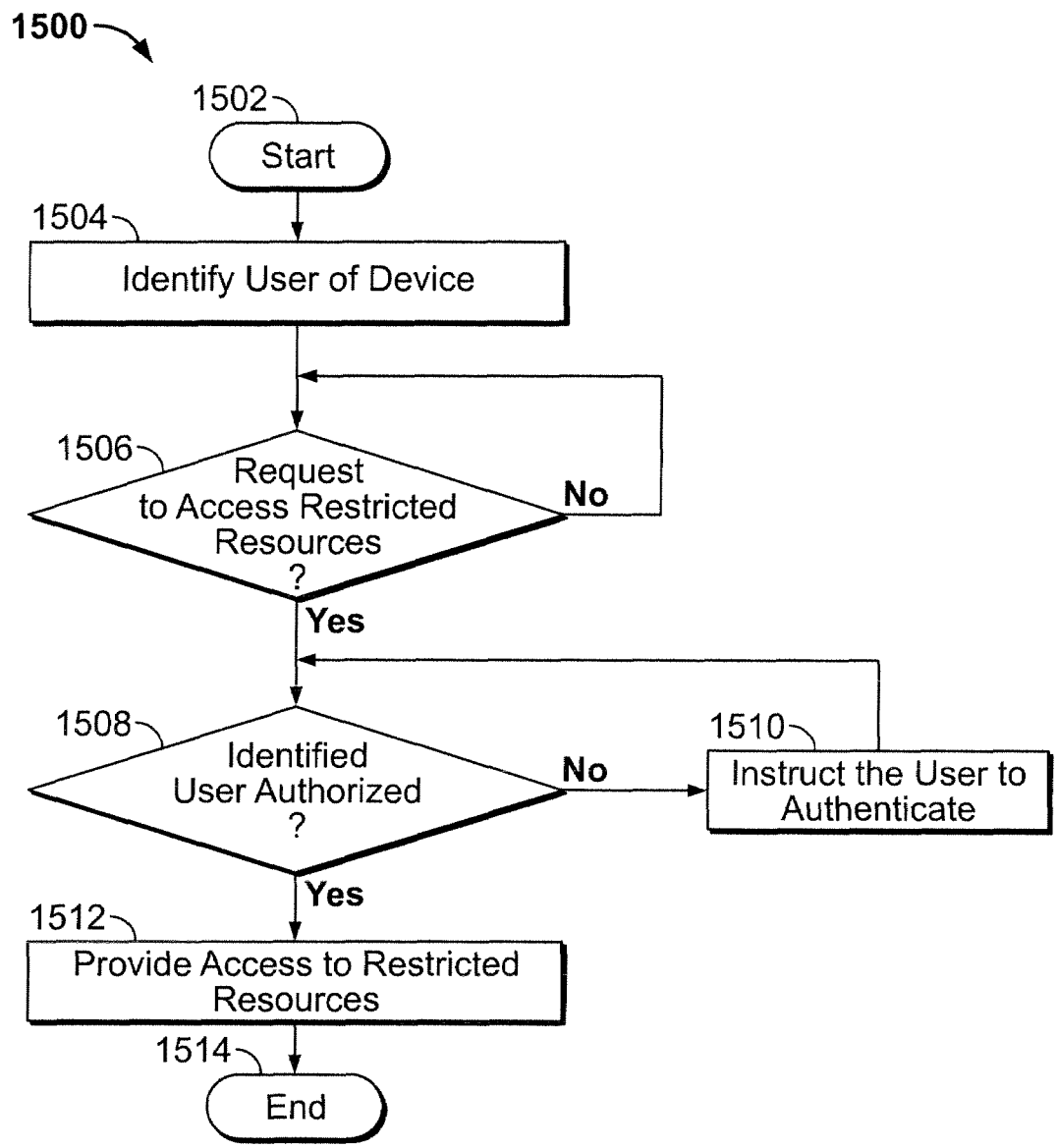
FIG. 15 is a flow chart of an illustrative process for authenticating a user in accordance with one embodiment of the invention.

FIG. 15 is a flow chart of an illustrative process for authenticating a user in accordance with one embodiment of the invention. Process 1500 may begin at step 1502. At step 1504, the electronic device may identify the user of the device. For example, the electronic device may receive a username or password associated with the user. As another example, the electronic device may receive authentication information using an authentication system and identify the user from the received authentication system. The electronic device may automatically receive authentication information without requiring an express input from the user, for example by placing a sensor of the authentication system in a manner that seamlessly captures authentication information as the user operates the device. As another example, the sensor may be operative to detect features of attributes of the user as soon as the user is within the field of view or sensing region of the sensor. In some embodiments, process 1500 may move directly from step 1502 to step 1506.

At step 1506 the electronic device may determine whether a request to access restricted resources was received. For example, the electronic device may determine whether the user provided an instruction to access data associated with a particular user (e.g., a contact list or other personal information). As another example, the electronic device may determine whether the user provided an instruction to access a restricted application (e.g., an application restricted to a particular tier of users, such as administrators, or an application purchased by a particular user). If the electronic device determines that no instruction to access restricted resources was received, process 1500 may return to step 1506 and continue to monitor inputs received from the user.

If, at step 1506, the electronic device instead determines that an instruction to access restricted resources was received, process 1500 may move to step 1508. At step 1508, the electronic device may determine whether the identified user is authorized to access the resources. For example, the electronic device may determine whether the user has provided suitable authentication information for accessing the restricted resources. The electronic device may receive suitable authentication information without the user's knowledge, for example by embedding an authentication sensor in the device such that authentication information is received during normal use. If the electronic device determines that the identified user is not authorized, process 1500 may move to step 1510. At step 1510, the electronic device may instruct the user to authenticate. For example, the electronic device may direct the user to provide authentication information to an authentication system (e.g., any of the authentication systems described above). In some embodiments, the electronic device may detect several inputs by the user, and determine whether the inputs have a pattern or share attributes associated with an authorized user (e.g., determine whether the user has provided the proper inputs that correspond to an attribute or pattern of an authorized user, or determine whether the attribute or pattern of the inputs matches an attribute or pattern associated with authorized users). Process 1500 may then return to step 1508 to determine whether the user has provided suitable authentication information.

If, at step 1508, the electronic device instead determines that the user is authorized, process 1500 may move to step 1512. At step 1512, the electronic device may provider the user with access to the requested restricted resources. For example, the electronic device may provide the user with access to personal data or to applications specific to the user. Process 1500 may then end at step 1514.

The above described embodiments of the invention are presented for the purposes of illustration and not of limitation, and the present invention is limited only by the claims which follow.

What is claimed is:

1. A method for authenticating a user of an electronic device, comprising:
   while access to one or more resources of the electronic device is restricted:
      displaying a plurality of shapes on a display of the electronic device;
      receiving a user selection that includes detecting a plurality of inputs selecting a subset of the plurality of shapes displayed on the display of the electronic device;
      while receiving the user selection, detecting time delays between consecutive inputs in the plurality of inputs;
      after receiving the user selection, determining whether the selected subset of the plurality of shapes meet visual pattern criteria based on which shapes in the plurality of shapes were selected and whether the user selection meets temporal pattern criteria based on one or more time delays between inputs in the plurality of inputs; and
   in response to the determining:
      in accordance with a determination that the user selection meets the visual pattern criteria and the temporal pattern criteria, providing access to the one or more restricted resources; and
      in accordance with a determination that the user selection does not meet both the visual pattern criteria and the temporal pattern criteria, forgoing providing access to the one or more restricted resources.

2. The method of claim 1, wherein receiving the user selection of the plurality of shapes includes receiving concurrent selection of two or more shapes in the subset of the plurality of shapes.

3. The method of claim 1, wherein receiving the user selection of the plurality of shapes includes receiving sequential selection of two or more shapes in the subset of the plurality of shapes.

4. The method of claim 1, wherein the subset of the plurality of shapes comprises a number of shapes in the range of 4 to 8.

5. The method of claim 1, including, in accordance with a determination that the user selection does not meet both the visual pattern criteria and the temporal pattern criteria, changing the distribution of the displayed shapes on the display.

6. The method of claim 1, wherein:
   the subset of the plurality of shapes includes a first shape, a second shape and a third shape;
   the user selection includes selecting the first shape, the second shape, and the third shape in that order; and
   the temporal pattern criteria include a criterion that is met when there is a first time delay between selection of the first shape and selection of the second shape and there is a second time delay, longer than the first time delay, between selection of the second shape and selection of the third shape.

7. The method of claim 1, wherein:
   the subset of the plurality of shapes includes a first shape, a second shape and a third shape;
   the user selection includes selecting the first shape, the second shape, and the third shape; and
   the temporal pattern criteria include a criterion that is met when the second shape and the third shape are selected simultaneously and there is a pause between selecting the first shape and the simultaneous selection of the second and third shapes.

8. An electronic device, comprising:
   a touch-sensitive display;
   one or more processors;
   memory; and
   one or more programs, wherein the one or more programs are stored in the memory and configured to be executed by the one or more processors, the one or more programs including instructions for:
      while access to one or more resources of the electronic device is restricted:
         displaying a plurality of shapes on the display of the electronic device;
         receiving a user selection that includes detecting a plurality of inputs selecting a subset of the plurality of shapes displayed on the display of the electronic device;
         while receiving the user selection, detecting time delays between consecutive inputs in the plurality of inputs;
         after receiving the user selection, determining whether the selected subset of the plurality of shapes meet visual pattern criteria based on which shapes in the plurality of shapes were selected and whether the user selection meets temporal pattern criteria based on one or more time delays between inputs in the plurality of inputs; and
      in response to the determining:
         in accordance with a determination that the user selection meets the visual pattern criteria and the temporal pattern criteria, providing access to the one or more restricted resources; and
         in accordance with a determination that the user selection does not meet both the visual pattern criteria and the temporal pattern criteria, forgoing providing access to the one or more restricted resources.

9. The electronic device of claim 8, wherein each input of the plurality of inputs comprises a touch on the touch-sensitive display.

10. The electronic device of claim 9, wherein each input of the plurality of inputs comprises a movement of one or more fingers of the user on the touch-sensitive display.

11. The device of claim 8, wherein receiving the user selection of the plurality of shapes includes receiving concurrent selection of two or more shapes in the subset of the plurality of shapes.

12. The device of claim 8, wherein receiving the user selection of the plurality of shapes includes receiving sequential selection of two or more shapes in the subset of the plurality of shapes.

13. The device of claim 8, wherein the one or more programs include instructions for, in accordance with a determination that the user selection does not meet both the visual pattern criteria and the temporal pattern criteria, changing the distribution of the displayed shapes on the display.

14. The device of claim 8, wherein:
the subset of the plurality of shapes includes a first shape, a second shape and a third shape;
the user selection includes selecting the first shape, the second shape, and the third shape in that order; and
the temporal pattern criteria include a criterion that is met when there is a first time delay between selection of the first shape and selection of the second shape and there is a second time delay, longer than the first time delay, between selection of the second shape and selection of the third shape.

15. The device of claim 8, wherein:
the subset of the plurality of shapes includes a first shape, a second shape and a third shape;
the user selection includes selecting the first shape, the second shape, and the third shape; and
the temporal pattern criteria include a criterion that is met when the second shape and the third shape are selected simultaneously and there is a pause between selecting the first shape and the simultaneous selection of the second and third shapes.

16. A non-transitory computer readable medium storing one or more programs, the one or more programs comprising instructions, which when executed by an electronic device with a touch-sensitive display, cause the device to:
while access to one or more resources of the electronic device is restricted:
display a plurality of shapes on a display of the electronic device;
receive a user selection that includes detecting a plurality of inputs selecting a first subset of the plurality of shapes displayed on the display of the electronic device;
after receiving the user selection, determine meet visual pattern criteria based on which shapes in the plurality of shapes were selected and whether the user selection meets temporal pattern criteria based on one or more time delays between inputs in the plurality of inputs; and
in response to the determining:
in accordance with a determination that the user selection meets the visual pattern criteria and the temporal pattern criteria, provide access to the one or more restricted resources; and
in accordance with a determination that the user selection does not meet both the visual pattern criteria and the temporal pattern criteria, forgo providing access to the one or more restricted resources.

17. The non-transitory computer readable storage medium of claim 16, wherein receiving the user selection of the plurality of shapes includes receiving concurrent selection of two or more shapes in the subset of the plurality of shapes.

18. The non-transitory computer readable storage medium of claim 16, wherein receiving the user selection of the plurality of shapes includes receiving sequential selection of two or more shapes in the subset of the plurality of shapes.

19. The non-transitory computer readable storage medium of claim 16, wherein the one or more programs include instructions which, when executed, cause the device to, in accordance with a determination that the user selection does not meet both the visual pattern criteria and the temporal pattern criteria, change the distribution of the displayed shapes on the display.

20. The non-transitory computer readable storage medium of claim 16, wherein:
the subset of the plurality of shapes includes a first shape, a second shape and a third shape;
the user selection includes selecting the first shape, the second shape, and the third shape in that order; and
the temporal pattern criteria include a criterion that is met when there is a first time delay between selection of the first shape and selection of the second shape and there is a second time delay, longer than the first time delay, between selection of the second shape and selection of the third shape.

21. The non-transitory computer readable storage medium of claim 16, wherein:
the subset of the plurality of shapes includes a first shape, a second shape and a third shape;
the user selection includes selecting the first shape, the second shape, and the third shape; and
the temporal pattern criteria include a criterion that is met when the second shape and the third shape are selected simultaneously and there is a pause between selecting the first shape and the simultaneous selection of the second and third shapes.

* * * * *